(12) United States Patent
Tabata

(10) Patent No.: US 10,522,181 B2
(45) Date of Patent: Dec. 31, 2019

(54) HIGH DENSITY OPTICAL RECORDING MEDIUM HAVING MULTIPLE RECORDING LAYERS

(71) Applicant: SONY CORPORATION, Tokyo (JP)

(72) Inventor: Hiroshi Tabata, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/090,929

(22) PCT Filed: Mar. 22, 2017

(86) PCT No.: PCT/JP2017/011322
§ 371 (c)(1),
(2) Date: Oct. 3, 2018

(87) PCT Pub. No.: WO2017/175580
PCT Pub. Date: Oct. 12, 2017

(65) Prior Publication Data
US 2019/0108854 A1 Apr. 11, 2019

(30) Foreign Application Priority Data
Apr. 8, 2016 (JP) ................................. 2016-078403

(51) Int. Cl.
*G11B 7/007* (2006.01)
*G11B 7/24038* (2013.01)
(Continued)

(52) U.S. Cl.
CPC ............ *G11B 7/007* (2013.01); *G11B 7/2433* (2013.01); *G11B 7/2437* (2013.01);
(Continued)

(58) Field of Classification Search
None
See application file for complete search history.

(56) References Cited

U.S. PATENT DOCUMENTS 8,545,957 B2 * 10/2013 Tabata ............... G11B 7/24038
428/64.1
8,632,870 B2 * 1/2014 Tabata ................... G11B 7/243
428/64.1
(Continued)

FOREIGN PATENT DOCUMENTS

JP          5346915          7/2012
JP          5662874          12/2012
(Continued)

*Primary Examiner* — Tan X Dinh
(74) *Attorney, Agent, or Firm* — K&L Gates LLP

(57) ABSTRACT

Provided is an optical recording medium including two or more recording layers, and a light irradiation surface that is irradiated with light for recording an information signal on the two or more recording layers. Among the two or more recording layers, at least one layer other than a layer located on the deepest side from the light irradiation surface includes an oxide of a metal A, an oxide of a metal B, and an oxide of a metal C. The metal A is at least one kind among W, Mo, and Zr, the metal B is Mn, and the metal C is at least one kind among Cu, Ag, and Ni. Ratios of the metal A, the metal B, and the metal C satisfy a relationship of $0.46 \leq x1$ (provided that, $x1=a/(b+0.8c)$, a representing an atomic ratio [atom %] of the metal A with respect to the sum of the metal A, the metal B, and the metal C, b representing an atomic ratio [atom %] of the metal B with respect to the sum of the metal A, the metal B, and the metal C, and c representing an atomic ratio [atom %] of the metal C with respect to the sum of the metal A, the metal B, and the metal C.

17 Claims, 5 Drawing Sheets

(51) Int. Cl.
  *G11B 7/2433* (2013.01)
  *G11B 7/24073* (2013.01)
  *G11B 7/26* (2006.01)
  *G11B 7/2437* (2013.01)
  *G11B 7/257* (2013.01)
  *G11B 7/243* (2013.01)

(52) U.S. Cl.
  CPC ...... *G11B 7/24038* (2013.01); *G11B 7/24073* (2013.01); *G11B 7/26* (2013.01); *G11B 2007/2432* (2013.01); *G11B 2007/24304* (2013.01); *G11B 2007/24306* (2013.01); *G11B 2007/24308* (2013.01); *G11B 2007/2571* (2013.01); *G11B 2007/25706* (2013.01); *G11B 2007/25708* (2013.01)

(56) References Cited

U.S. PATENT DOCUMENTS

| | | | | |
|---|---|---|---|---|
| 8,865,286 B2* | 10/2014 | Tabata | ................. | G11B 7/2578 428/64.1 |
| 9,552,839 B2* | 1/2017 | Yoshida | ................. | B32B 3/266 |
| 9,830,941 B2* | 11/2017 | Sone | ................. | G11B 7/24038 |
| 10,176,839 B2* | 1/2019 | Tabata | ................. | G11B 7/24038 |
| 2004/0130998 A1* | 7/2004 | Iwasa | ................. | G11B 7/24038 369/94 |
| 2012/0176883 A1* | 7/2012 | Tauchi | ................. | G11B 7/2433 369/283 |
| 2012/0201993 A1* | 8/2012 | Tabata | ................. | G11B 7/2403 428/64.4 |
| 2013/0071653 A1* | 3/2013 | Kojima | ............. | G11B 7/24035 428/336 |
| 2014/0030489 A1* | 1/2014 | Miki | .................... | G11B 7/2403 428/167 |
| 2015/0132606 A1* | 5/2015 | Kurokawa | ......... | G11B 7/24038 428/696 |
| 2017/0323660 A1* | 11/2017 | Tsuchino | ........... | G11B 7/24038 |

FOREIGN PATENT DOCUMENTS

| | | |
|---|---|---|
| JP | 2013-086336 | 5/2013 |
| JP | 5799742 | 5/2013 |
| JP | 2014026704 A | 2/2014 |
| WO | 2012/120817 | 9/2012 |
| WO | 2012120817 | 9/2012 |
| WO | 2013183277 | 12/2013 |
| WO | 2015083337 | 6/2015 |

* cited by examiner

A

B

A

B

A

B

HIGH DENSITY OPTICAL RECORDING MEDIUM HAVING MULTIPLE RECORDING LAYERS

CROSS-REFERENCE TO RELATED APPLICATIONS

The present application claims the benefit of International Application No. PCT/JP2017/011322, filed Mar. 22, 2017, which claims priority to Japanese Application No. 2016078403, filed Apr. 8, 2016, the disclosures of which are incorporated herein by reference.

BACKGROUND

The present technology relates to an optical recording medium, a method of manufacturing the same, and a recording layer for an optical recording medium, and more particularly, to an optical recording medium including two or more recording layers.

Hitherto, a compact disc (CD), a digital versatile disc (DVD), a Blu-ray disc (BD, registered trademark), and the like have led the market of optical recording media. However, recently, along with 4K video, file base of video, and a rapid increase in data stored as cold data, a further increase in capacity has been demanded for an optical recording medium. To cope with this demand, a large-capacity optical recording medium corresponding to a double-sided recording layer such as an archival disc (AD) has appeared, and a market of a new large-capacity optical recording medium has been raised.

Examples of recordable optical recording medium includes a rewrite type optical recording medium represented by a compact disc-rewritable (CD-RW) and a digital versatile disc±rewritable (DVD±RW), and a write-once type optical recording medium represented by a compact disc-recordable (CD-R) and a digital versatile disc-recordable (DVD-R), and the latter has greatly contributed to expansion of a market as a cheap medium. Accordingly, even in a large-capacity optical recording medium corresponding to a blue laser, it is considered that a reduction in the cost of the write-once type optical recording medium is necessary to expand a market.

In addition, storage reliability of the optical recording medium is typically higher in comparison to a hard disk drive (HDD), a flash memory, and the like due to recording and reproduction principle thereof. For example, the optical recording medium begins to be used for storage of important information, and a demand as archival media has been increasing in recent years.

Examples of a recording material that can be used in the write-once type optical recording medium include an inorganic material and an organic pigment material.
In a write-once type optical recording medium of the related art, as the recording material, the organic pigment material has been mainly examined. However, in a recent large-capacity optical recording medium, as the recording material, the inorganic material has been widely examined (for example, refer to Patent Document 1 to Patent Document 3).

However, in recent, in a high-density optical recording medium such as a recordable DVD and a recordable BD, to further increase recording capacity, a technology of forming the recording layer as a multi-layer has been widely employed. In a multi-layer optical recording medium, recording and reproduction of an information signal with respect to a recording layer located on the deepest side from an information reading side are performed by using laser light that is transmitted through recording layers on a front side. Accordingly, as the number of recording layers increases, the number of recording layers through which the laser light is transmitted until reaching the recording layer located on the deepest side increases. Accordingly, recording layers other than the recording layer located on the deepest side from the information reading surface side are desired to have a high transmittance. In addition, a configuration in which a multi-layer film is disposed on both surfaces of a medium is also employed to increase the recording capacity. According to the double-sided configuration, capacity also increases approximately two times.

In the write-once type optical recording medium, a demand for multi-layering of the recording layer to increase recording capacity has increased, and to cope with the demand, an improvement of a transmittance of an inorganic recording layer becomes one important technology.

SUMMARY

Problems to be Solved by the Invention

An object of the present technology is to provide a recording layer for optical recording medium with excellent transmission characteristics, an optical recording medium including the recording layer, and a method of manufacturing the optical recording medium.

Solutions to Problems

In order to solve the above issue, a first technology is an optical recording medium including: two or more recording layers; and a light irradiation surface that is irradiated with light for recording an information signal on the two or more recording layers, in which among the two or more recording layers, at least one layer other than a layer located on the deepest side from the light irradiation surface includes an oxide of a metal A, an oxide of a metal B, and an oxide of a metal C, the metal A is at least one kind among W, Mo, and Zr, the metal B is Mn, and the metal C is at least one kind among Cu, Ag, and Ni, and ratios of the metal A, the metal B, and the metal C satisfy a relationship of $0.46 \leq x1$ (provided that, $x1 = a/(b+0.8c)$, a representing an atomic ratio [atom %] of the metal A with respect to the sum of the metal A, the metal B, and the metal C, b representing an atomic ratio [atom %] of the metal B with respect to the sum of the metal A, the metal B, and the metal C, and c representing an atomic ratio [atom %] of the metal C with respect to the sum of the metal A, the metal B, and the metal C).

A second technology is an optical recording medium including: two or more recording layers; and a light irradiation surface that is irradiated with light for recording an information signal on the two or more recording layers, in which among the two or more recording layers, at least one layer other than a layer located on the deepest side from the light irradiation surface includes an oxide of a metal A, an oxide of a metal B, an oxide of a metal C, and an oxide of a metal D, the metal A is at least one kind among W, Mo, and Zr, the metal B is Mn, the metal C is at least one kind among Cu, Ag, and Ni, and the metal D is at least one kind of Zn and Mg, and ratios of the metal A, the metal B, the metal C, and the metal D satisfy a relationship of $0.46 \leq x2$ (provided that, $x2 = (0.1d+a)/(b+0.8c)$, a representing an atomic ratio [atom %] of the metal A with respect to the sum of the metal A, the metal B, the metal C, and the metal D, b representing an atomic ratio [atom %] of the metal B with respect to the sum of the metal A, the metal B, the metal C, and the metal D, c representing an atomic ratio [atom %] of the metal C with respect to the sum of the metal A, the metal B, the metal C, and the metal D, and d representing an atomic ratio [atom %] of the metal D with respect to the sum of the metal A, the metal B, the metal C, and the metal D).

A third technology is a recording layer for an optical recording medium including: an oxide of a metal A; an oxide of a metal B; and an oxide of a metal C, in which the metal A is at least one kind among W, Mo, and Zr, the metal B is Mn, and the metal C is at least one kind among Cu, Ag, and Ni, and ratios of the metal A, the metal B, and the metal C satisfy a relationship of $0.46 \leq x1$ (provided that, $x1=a/(b+0.8c)$, a representing an atomic ratio [atom %] of the metal A with respect to the sum of the metal A, the metal B, and the metal C, b representing an atomic ratio [atom %] of the metal B with respect to the sum of the metal A, the metal B, and the metal C, and c representing an atomic ratio [atom %] of the metal C with respect to the sum of the metal A, the metal B, and the metal C).

A fourth technology is a recording layer for an optical recording medium including: an oxide of a metal A; an oxide of a metal B; an oxide of a metal C; and an oxide of a metal D, in which the metal A is at least one kind among W, Mo, and Zr, the metal B is Mn, the metal C is at least one kind among Cu, Ag, and Ni, and the metal D is at least one kind of Zn and Mg, ratios of the metal A, the metal B, the metal C, and the metal D satisfy a relationship of $0.46 \leq x2$ (provided that, $x2=(0.1d+a)/(b+0.8c)$, a representing an atomic ratio [atom %] of the metal A with respect to the sum of the metal A, the metal B, the metal C, and the metal D, b representing an atomic ratio [atom %] of the metal B with respect to the sum of the metal A, the metal B, the metal C, and the metal D, c representing an atomic ratio [atom %] of the metal C with respect to the sum of the metal A, the metal B, the metal C, and the metal D, and d representing an atomic ratio [atom %] of the metal D with respect to the sum of the metal A, the metal B, the metal C, and the metal D).

A fifth technology is method of manufacturing an optical recording medium including: a process of forming two or more recording layers by reactive sputtering with at least oxygen, in which among the two or more recording layers, at least one layer other than a layer located on the deepest side from the light irradiation surface irradiated with light for recording an information signal on the two or more recording layers includes an oxide of a metal A, an oxide of a metal B, and an oxide of a metal C, the metal A is at least one kind among W, Mo, and Zr, the metal B is Mn, and the metal C is at least one kind among Cu, Ag, and Ni, and ratios of the metal A, the metal B, and the metal C satisfy a relationship of $0.46 \leq x1$ (provided that, $x1=a/(b+0.8c)$, a representing an atomic ratio [atom %] of the metal A with respect to the sum of the metal A, the metal B, and the metal C, b representing an atomic ratio [atom %] of the metal B with respect to the sum of the metal A, the metal B, and the metal C, and c representing an atomic ratio [atom %] of the metal C with respect to the sum of the metal A, the metal B, and the metal C).

A sixth technology is a method of manufacturing an optical recording medium including: a process of forming two or more recording layers by reactive sputtering with at least oxygen, in which among the two or more recording layers, at least one layer other than a layer located on the deepest side from the light irradiation surface irradiated with light for recording an information signal on the two or more recording layers includes an oxide of a metal A, an oxide of a metal B, an oxide of a metal C, and an oxide of a metal D, the metal A is at least one kind among W, Mo, and Zr, the metal B is Mn, the metal C is at least one kind among Cu, Ag, and Ni, and the metal D is at least one kind of Zn and Mg, and ratios of the metal A, the metal B, the metal C, and the metal D satisfy a relationship of $0.46 \leq x2$ (provided that, $x2=(0.1d+a)/(b+0.8c)$, a representing an atomic ratio [atom %] of the metal A with respect to the sum of the metal A, the metal B, the metal C, and the metal D, b representing an atomic ratio [atom %] of the metal B with respect to the sum of the metal A, the metal B, the metal C, and the metal D, c representing an atomic ratio [atom %] of the metal C with respect to the sum of the metal A, the metal B, the metal C, and the metal D, and d representing an atomic ratio [atom %] of the metal D with respect to the sum of the metal A, the metal B, the metal C, and the metal D).

Effects of the Invention

As described above, according to the present technology, it is possible to realize a recording layer for an optical recording medium with excellent transmission characteristics.

DETAILED DESCRIPTION

In the present technology, it is preferable that a plurality of recording layers are provided in a substrate, and a cover layer is provided on the recording layers. Although the thickness of the cover layer is not particularly limited, in a high-density optical recording medium, it is preferable that a thin light-transmitting layer such as a sheet and a coating layer is employed as the cover layer so as to use an objective lens with high NA, and irradiation with light is performed from the light-transmitting layer side to carry out recording and reproduction of an information signal. In this case, an opaque substrate can be employed as the substrate. An incidence surface of light for recording and reproducing an information signal is appropriately set to at least one of a cover layer side surface or a substrate side surface in correspondence with a format of the optical recording medium.

In the present technology, from the viewpoint of improving storage reliability, it is preferable that the optical recording medium further includes a dielectric layer at least one surface of the recording layer, and it is more preferable that the dielectric layer is provided on both surfaces of the recording layer. From the viewpoints of a layer configuration and simplification of a manufacturing facility, it is preferable that the dielectric layer is not provided on any surface of the recording layer, and the recording layer is used alone.

In the present technology, in a case where the optical recording medium is provided with a plurality of information signal layers including the recording layer and the dielectric layer that is provided on at least one surface of the recording layer, from the viewpoint of productivity, it is preferable that the plurality of information signal layers have the same layer configuration. In a case where the plurality of information signal layers have the same layer configuration including a first dielectric layer, the recording layer, and a second dielectric layer, from the viewpoint of productivity, it is preferable that each of the first dielectric layer, the recording layer, and the second dielectric layer includes the same kind of material in the information signal layers.

With respect to embodiments of the present technology, description will be given in the following order.
1 First Embodiment
1.1 Configuration of Optical Recording Medium
1.2 Method of Manufacturing Optical Recording Medium
1.3 Effect
2 Second Embodiment
2.1 Configuration of Optical Recording Medium
2.2 Method of Manufacturing Optical Recording Medium
2.3 Effect 1 First Embodiment

[1.1 Configuration of Optical Recording Medium]

Figure 1:
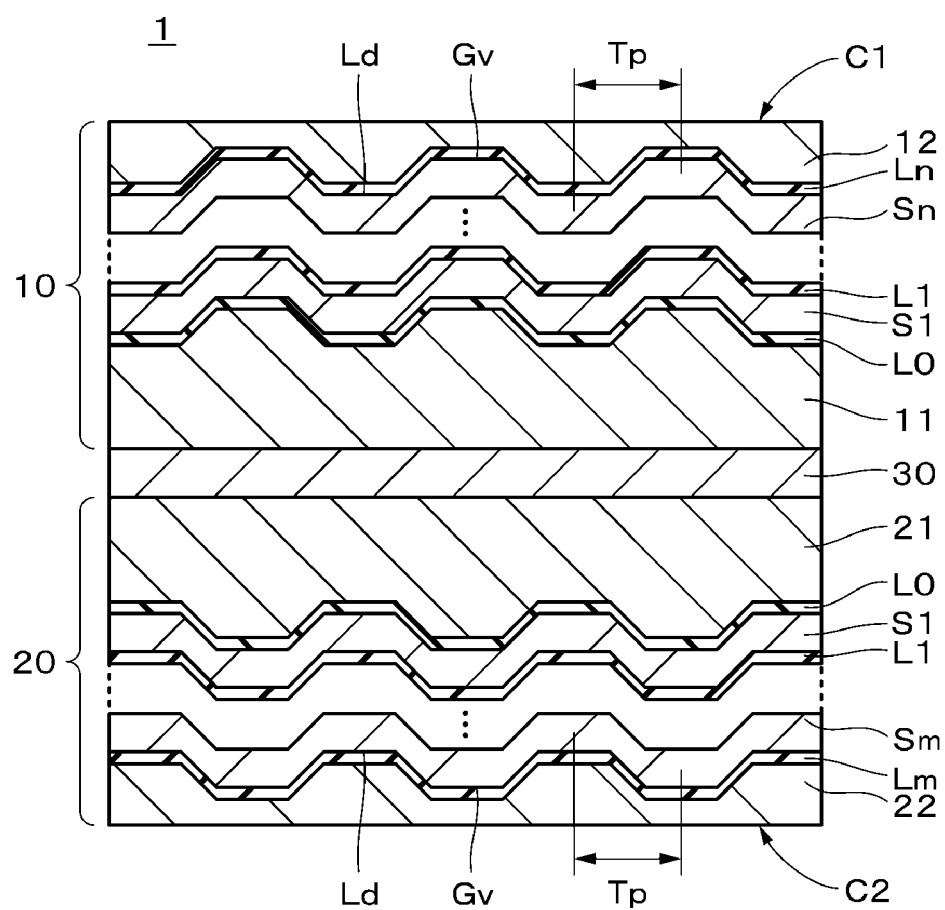
FIG. 1 is a schematic cross-sectional view illustrating a configuration example of an optical recording medium according to a first embodiment of the present technology.

As illustrated in FIG. 1, an optical recording medium 1 according the first embodiment of the present technology is a so-called multi-layer write-once type optical recording medium, and includes a first disc 10, a second disc 20, and a joining layer 30 that is provided between the first and second discs 10 and 20. The optical recording medium 1 is an optical recording medium of a type in which data is recorded on both of a groove track and a land track (hereinafter, referred to as "land/groove recording type"), and has a disc shape in which an opening (hereinafter, referred to as "center hole") is formed at the center. Furthermore, the shape of the optical recording medium 1 is not limited to the disc shape and may be other shapes.

The first disc 10 has a configuration in which an information signal layer L0, a spacer layer S1, an information signal layer L1, . . . , a spacer layer Sn, an information signal layer Ln, and a light-transmitting layer 12 that is a cover layer are laminated in this order on one main surface of a substrate 11. The second disc 20 has a configuration in which an information signal layer L0, a spacer layer S1, an information signal layer L1, . . . , a spacer layer Sm, an information signal layer Lm, and a light-transmitting layer 22 that is a cover layer are laminated in this order on one main surface of a substrate 21. Here, n and m are each independently an integer of 2 or greater. Furthermore, in the following description, in a case where the information signal layers L0 to Ln, and L0 to Lm are not particularly distinguished, the information signal layers are described as an information signal layer L.

The optical recording medium 1 includes a light irradiation surface, which is irradiated with light for recording or reproducing an information signal, on both surfaces. More specifically, the optical recording medium 1 includes a first light irradiation surface C1 that is irradiated with laser light for carrying out recording or reproduction of an information signal of the first disc 10, and a second light irradiation surface C2 that is irradiated with laser light for carrying out recording or reproduction of an information signal of the second disc 20.

In the first disc 10, the information signal layer L0 is located on the deepest side with the first light irradiation surface C1 set as a reference, and the information signal layers L1 to Ln are located on a front side of the information signal layer L0. According to this, the information signal layers L1 to Ln are configured to allow laser light used in recording or reproduction to be transmitted therethrough. On the other hand, in the second disc 20, the information signal layer L0 is located on the deepest side with the second light irradiation surface C2 set as a reference, and the information signal layers L1 to Lm are located on a front side of the information signal layer L0. According to this, the information signal layers L1 to Lm are configured to allow laser light used in recording or reproduction to be transmitted therethrough. Furthermore, although not illustrated in the drawing, the optical recording medium 1 may be provided with a hard coat layer on surfaces (the first and second light irradiation surfaces C1 and C2) of the light-transmitting layers 12 and 22.

In the optical recording medium 1, recording or reproduction of an information signal of the first disc 10 is performed as follows. Specifically, recording or reproduction of the information signal of the first disc 10 is performed by irradiating the respective information signal layers L0 to Ln included in the first disc 10 with laser light from the first light irradiation surface C1 on the light-transmitting layer 12 side. For example, laser light having a wavelength in a range of 350 nm to 410 nm is condensed by an objective lens having a numerical aperture in a range of 0.84 to 0.86, and the respective information signal layers L0 to Ln included in the first disc 10 are irradiated with the laser light from the light-transmitting layer 12 side. According to this, recording or reproduction of the information signal is performed.

On the other hand, recording or reproduction of the information signal of the second disc 20 is performed as follows. Specifically, recording or reproduction of the information signal of the second disc 20 is performed by irradiating the respective information signal layers L0 to Lm included in the second disc 20 with laser light from the second light irradiation surface C2 on the light-transmitting layer 22 side. For example, laser light having a wavelength in a range of 350 nm to 410 nm is condensed by an objective lens having a numerical aperture in a range of 0.84 to 0.86, and the respective information signal layers L0 to Lm included in the second disc 20 are irradiated with the laser light from the light-transmitting layer 22 side. According to this, recording or reproduction of the information signal is performed. Spiral directions of the first disc 10 and the second disc 20 may be opposite to each other. In this case, simultaneous recording and reproduction of the optical recording medium (double-sided disc) 1 in which the first disc 10 and the second disc 20 are joined are possible, and thus a data transmission speed during recording or reproduction can be raised approximately two times.

Hereinafter, the substrates 11 and 21, the joining layer 30, the information signal layers L0 to Ln and L0 to Lm, the spacer layers S1 to Sn and S1 to Sm, and the light-transmitting layers 12 and 22, which constitute the optical recording medium 1, will be sequentially described.

(Substrate)

For example, the substrates 11 and 21 have a disc shape in which a center hole is provided at the center. For example, one main surface of the substrates 11 and 21 is set to an uneven surface, and the information signal layer L0 is formed as a film on the uneven surface. In the following description, in the uneven surface, a recessed portion is referred to as a land Ld, and a convex portion is referred to as a groove Gv.

Examples of a shape of the land Ld and the groove Gv include various shapes such as a spiral shape and a concentric circular shape. In addition, the land Ld and/or the groove Gv may be wobbled (meandered) for stabilization of a linear velocity, addition of address information, and the like.

As an outer diameter (diameter) of the substrates 11 and 21, for example, 120 mm is selected. As an inner diameter (diameter) of the substrates 11 and 21, for example, 15 mm is selected. The he thickness of the substrate 11 is selected in consideration of rigidity, and the thickness is preferably 0.3 mm to 0.545 mm, and more preferably 0.445 mm to 0.545 mm.

As a material of the substrates 11 and 21, for example, a plastic material or glass can be used, and it is preferable to use the plastic material from the viewpoint of moldability. As the plastic material, for example, a polycarbonate-based resin, a polyolefin-based resin, an acryl-based resin, and the like can be used. In addition, the polycarbonate-based resin is frequently used from the viewpoint of the cost.

(Joining Layer)

The joining layer 30 is constituted by an ultraviolet curable resin that is cured. The first disc 10 and the second disc 20 are joined by the joining layer 30. More specifically, the substrate 11 of the first disc 10 and the substrate 21 of the second disc substrate are joined in a state in which the light-transmitting layers 12 and 22 are set as a surface side.

For example, the thickness of the joining layer 30 is 0.01 mm to 0.22 mm. For example, the ultraviolet curable resin is a radical polymerization ultraviolet curable resin.

(Information Signal Layer)

The information signal layer L includes a recessed track (hereinafter, referred to as "land track"), and a convex track (hereinafter, referred to as "groove track"). The optical recording medium 1 according to this embodiment has a configuration in which an information signal can be recorded on both the land track and the groove track. A pitch Tp of the land track and the groove track is preferably 0.225 nm or less from the viewpoint of a high recording density.

Figure 2:
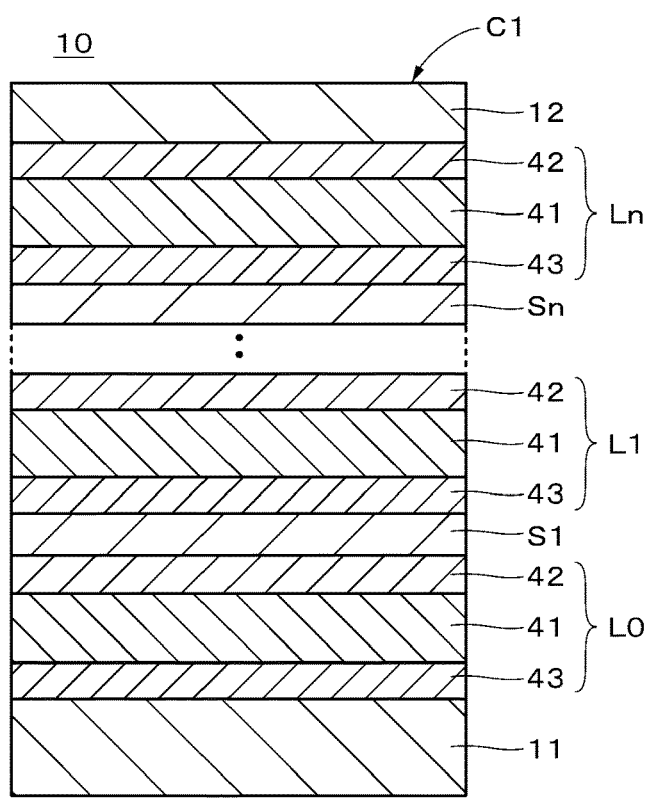
FIG. 2 is a schematic view illustrating a configuration example of respective information signal layers illustrated in FIG. 1.

As illustrated in FIG. 2, the information signal layers L0 to Ln include an inorganic recording layer 41 including an upper surface (first main surface) and a lower surface (second main surface), a dielectric layer 42 that is provided adjacently to the upper surface of the inorganic recording layer 41, and a dielectric layer 43 that is provided adjacently to the lower surface of the inorganic recording layer 41. According to this configuration, it is possible to improve durability of the inorganic recording layer 41. Here, the upper surface represents a main surface on a side that is irradiated with laser light for recording or reproducing an information signal between both main surfaces of the inorganic recording layer 41, and the lower surface represents a main surface that is opposite to the side that is irradiated with the laser light, that is, on the substrate 11 side. Furthermore, a configuration of the information signal layers L0 to Lm is similar to the configuration of the information signal layers L0 to Ln, and thus description thereof will be omitted.

(Recording Layer)

At least one layer of the inorganic recording layer 41 among the information signal layers L1 to Ln other than the information signal layers L0 located on the deepest side from the first light irradiation surface C1 includes an oxide of a metal A, an oxide of a metal B, and an oxide of a metal C as a main component. The metal A is at least one kind among W, Mo, and Zr, the metal B is Mn, and the metal C is at least one kind among Cu, Ag, and Ni. Ratios of the metal A, the metal B, and the metal C, which are respectively included in the oxide of the metal A, the oxide of the metal B, and the oxide of the metal C, satisfy a relationship of $0.46 \leq x1$, and preferably $0.46 \leq x1 \leq 1.70$. With this relationship, excellent transmission characteristics are realized while satisfying characteristics obtained as the information signal layer L of the optical recording medium 1. Here, examples of the characteristics obtained as the information signal layer L of the optical recording medium 1 include satisfactory signal characteristics, a high recording power margin, high reproduction durability, and the like.

Here, x1 is a variable that is defined by $x1=a/(b+0.8c)$.

a: Atomic ratio [atom %] of the metal A with respect to the sum of the metal A, the metal B, and the metal C b: Atomic ratio [atom %] of the metal B with respect to the sum of the metal A, the metal B, and the metal C c: Atomic ratio [atom %] of the metal C with respect to the sum of the metal A, the metal B, and the metal C From the view point of increasing an amount of light that reaches the information signal layer L0 that is located on the deepest side from the first light irradiation surface C1, it is preferable that all of the inorganic recording layers 41 of the information signal layers L1 to Ln other than the information signal layer L0 include a ternary-compound-system oxide as a main component, and the above-described relationship ($0.46 \leq x1$) is satisfied. In addition, typically, higher recording sensitivity is necessary for the information signal layer L that is closer to the deepest information signal layer L0, and thus a transmittance is likely to be lowered. According to this, the information signal layer L, which is closer to the first light irradiation surface C1, is designed to have a higher transmittance in many cases. Accordingly, it is preferable that a value of the variable x1 of the inorganic recording layers 41 of the information signal layers L1 to Ln is larger as the information signal layer L is closer to the first light irradiation surface C1.

In addition, from the viewpoints of the satisfactory signal characteristics, the high recording power margin, and the high reproduction durability, it is preferable that all of the inorganic recording layers 41 of the information signal layers L0 to Ln include the ternary-compound-system oxide as a main component, and the above-described relationship ($0.46 \leq x1$) is satisfied. In addition, it is preferable that the value of the variable x1 of the inorganic recording layers 41 of the information signal layers L0 to Ln is larger as the information signal layer L is closer to the first light irradiation surface C1. The reason for this is because a transmittance can be set to be higher as the information signal layer L is closer to the first light irradiation surface C1.

The atomic ratio a of the metal A with respect to the sum of the metal A, the metal B, and the metal C is preferably in a range of 10 atom % to 70 atom %, and more preferably in a range of 33 atom % to 68 atom %. When the atomic ratio a is less than 10 atom %, the transmittance tends to be lowered. On the other hand, when the atomic ratio a is greater than 70 atom %, recording sensitivity tends to decrease.

The atomic ratio b of the metal B with respect to the sum of the metal A, the metal B, and the metal C is preferably in a range of 2 atom % to 40 atom %, and more preferably in a range of 5 atom % to 30 atom %. When the atomic ratio b is less than 2 atom %, the recording power margin tends to be narrowed. On the other hand, when the atomic ratio b is greater than 40 atom %, the transmittance tends to be lowered.

The atomic ratio c of the metal C with respect to the sum of the metal A, the metal B, and the metal C is preferably in a range of 5 atom % to 50 atom %, and more preferably in a range of 27 atom % to 37 atom %. When the atomic ratio c is less than 5 atom %, the reproduction durability tends to be weak. On the other hand, when the atomic ratio c is greater than 50 atom %, the transmittance tends to be lowered.

As the material of the inorganic recording layer 41 other than the ternary-compound-system oxide in the information signal layers L1 to Ln, for example, a mixture of an In oxide and a Pd oxide, or a mixture of a W oxide and a Pd oxide can also be used. However, it is preferable to use the ternary-compound-system oxide that does not include Pd that is a noble metal as the material of the inorganic recording layer 41 from the viewpoint of a reduction in the cost of the optical recording medium 1.

As the material of the inorganic recording layer 41 of the information signal layer L0 that is located on the deepest side from the first light irradiation surface C1, the mixture of the In oxide and the Pd oxide or the mixture of the W oxide and the Pd oxide can also be used. However, as the material of the inorganic recording layer 41, it is preferable to use the ternary-compound-system oxide from the viewpoint of a reduction in the cost.

The thickness of the inorganic recording layer 41 is preferably in a range of 25 nm to 60 nm, and more preferably in a range of 30 nm to 50 nm. When the thickness is less than 25 nm, signal characteristics tend to deteriorate. On the other hand, when the thickness is greater than 60 nm, the recording power margin tends to be narrowed.

(Dielectric Layer)

The dielectric layers 42 and 43 function as an oxygen barrier layer, and thus it is possible to improve durability of the inorganic recording layer 41. In addition, oxygen of the inorganic recording layer 41 is suppressed from being escaped, and thus it is possible to suppress a variation (mainly detected as a decrease in reflectance) of a film quality of the inorganic recording layer 41, and it is possible to secure a film quality necessary as the inorganic recording layer 41. In addition, when the dielectric layers 42 and 43 are provided, it is possible to improve recording characteristics. The reason for this is considered as follows. Thermal diffusion of laser light incident to the dielectric layers 42 and 43 is optimally controlled, and thus a bubble in a recording portion is suppressed from being excessively enlarged, or collapse of a bubble due to excessive progress of decomposition of a Mn oxide is suppressed. As a result, it is possible to optimize a shape of the bubble during recording.

It is preferable that an optical film thickness (optical path length) n×T (provided that, n represents a refractive index of the dielectric layer 43 and T represents a physical film thickness of the dielectric layer 43) of the dielectric layer 43 satisfies a relationship of n×T≥32 nm. The reason for this is because it is possible to suppress a tracking offset when recording (land/groove recording) an information signal on the land Ld as a recessed portion or the groove Gv as a convex portion.

For example, a material of the dielectric layers 42 and 43 includes at least one or more kinds selected from the group consisting of an oxide, a nitride, a sulfide, a carbide, and a fluoride. As the material of the dielectric layers 42 and 43, the same material or materials different from each other may be used. Examples of the oxide include oxides of one or more kinds of elements selected from the group consisting to In, Zn, Sn, Al, Si, Ge, Ti, Ga, Ta, Nb, Hf, Zr, Cr, Bi, and Mg. Examples of the nitride include nitrides of one or more kinds of elements selected from the group consisting of In, Sn, Ge, Cr, Si, Al, Nb, Mo, Ti, Nb, Mo, Ti, W, Ta, and Zn, and preferably nitrides of one or more kinds of elements selected from the group consisting of Si, Ge, and Ti. Examples of the sulfide include a Zn sulfide. Examples of the carbide include carbides of one or more kinds of elements selected from the group consisting of In, Sn, Ge, Cr, Si, Al, Ti, Zr, Ta, and W, and preferably carbides of one or more kinds of elements selected from the group consisting of Si, Ti, and W. Examples of the fluoride include fluorides of one or more kinds of elements selected from the group consisting of Si, Al, Mg, Ca, and La. Examples of a mixture thereof include ZnS—$SiO_2$, $SiO_2$—$In_2O_3$—$ZrO_2$ (SIZ), $SiO_2$—$Cr_2O_3$—$ZrO_2$ (SCZ), $In_2O_3$—$SnO_2$ (ITO), $In_2O_3$—$CeO_2$ (ICO), $In_2O_3$—$Ga_2O_3$(IGO), $In_2O_3$—$Ga_2O_3$—ZnO (IGZO), $Sn_2O_3$—$Ta_2O_5$(TTO), $TiO_2$—$SiO_2$, $Al_2O_3$—ZnO, $Al_2O_3$—BaO, and the like.

The thickness of the dielectric layer 43 is preferably in a range of 2 nm to 30 nm. When the thickness is less than 2 nm, the barrier effect tends to decrease. On the other hand, when the thickness is greater than 30 nm, the recording power margin tends to be reduced (tends to deteriorate).

The thickness of the dielectric layer 42 is preferably in a range of 2 nm to 50 nm. When the thickness is less than 2 nm, the barrier effect tends to decrease. On the other hand, when the thickness is greater than 50 nm, the recording power margin tends to be reduced (tends to deteriorate).

In a case where the number of the information signal layers L of the first and second discs 10 and 20 is three, as the information signal layers L0 to L2, it is preferable to use information signal layers having the following configuration in combination with each other. In the inorganic recording layer 41 of the information signal layer L1 in which high sensitivity is obtained and is close to the deepest layer in which the value of x1 becomes a small value, Mn or Cu is likely to be rich, and thus a transmittance variation after recording is likely to be enlarged. According to this, it is preferable to use a layer having an extinction coefficient of 0.05 or greater as the dielectric layers 42 and 43 to suppress the transmittance variation. In addition, in the inorganic recording layer 41 of the information signal layer L2 in which a high transmittance is obtained, and x1 becomes a large value, the transmittance variation after recording is small, but the power margin is likely to be narrowed. Accordingly, it is preferable to use a layer including SIZ or IGZO as the dielectric layers 42 and 43 to secure the power margin.

(Information Signal Layer L0)
Dielectric layer 42: SIZ
Inorganic recording layer 41: WCOM ($0.3 \leq x1 \leq 0.5$)
Dielectric layer 43: ITO
(Information Signal Layer L1)
Dielectric layer 42: SIZ
Inorganic recording layer 41: WCOM ($0.6 \leq x1 \leq 1.0$)
Dielectric layer 43: SIZ (Information Signal Layer L2)
Dielectric layer 42: SIZ
Inorganic recording layer 41: WCOM (0.9≤x1≤1.4)
Dielectric layer 43: SIZ Furthermore, in this specification, "WCMO" represents a mixture including three components of the W oxide, the Mn oxide, and the Cu oxide.

(Spacer Layer)

The spacer layers S1 to Sn and S1 to Sm play a role of spacing the information signal layers L0 to Ln, and L0 to Lm with a physically and optically sufficient distance, and a uneven surface is provided on a surface thereof. For example, the uneven surface forms concentric circular or spiral land Ld and groove Gv. The thickness of each of spacer layer S1 to Sn and S1 to Sm is preferably set to 9 μm to 50 μm. Although not particularly limited, as a material of the spacer layers S1 to Sn and S1 to Sm, it is preferable to use an ultraviolet curable acrylic resin. In addition, the spacer layers S1 to Sn and S1 to Sm becomes light paths of laser light for data recording and reproduction toward deep layers, and thus it is preferable to have a sufficiently high light-transmitting property.

(Light-Transmitting Layer)

For example, the light-transmitting layers 12 and 22 are resin layers formed by curing a photosensitive resin such as an ultraviolet curable resin. Examples of a material of the resin layer include an ultraviolet curable acrylic resin. In addition, the light-transmitting layers 12 and 22 may include a light-transmitting sheet having an annular shape, and an adhesive layer that joins the light-transmitting sheet to the information signal layer Ln or Lm. It is preferable that the light-transmitting sheet includes a material that has low absorption capability with respect to laser light that is used in recording and reproduction, specifically, a material having a transmittance of 90% or greater. As the material of the light-transmitting sheet, for example, a polycarbonate resin material, a polyolefin-based resin (for example, ZEONEX (registered trademark)), and the like can be used. As a material of the adhesive layer, for example, an ultraviolet curable resin, a pressure sensitive adhesive (PSA), and the like can be used.

The thickness of each of the light-transmitting layers 12 and 22 is preferably selected in a range of 10 μm to 177 μm. For example, 57 μm is selected as the thickness. For example, when the thin light-transmitting layers 12 and 22 are combined with an objective lens with a numerical aperture (NA) as high as approximately 0.85, it is possible to realize high-density recording.

(Hard Coat Layer)

The hard coat layer is configured to apply scratch resistance or the like to the first and second light irradiation surfaces C1 and C2. As a material of the hard coat layer, for example, an acryl-based resin, a silicone-based resin, a fluorine-based resin, an organic-inorganic hybrid-based resin, and the like can be used. The hard coat layer may include a fine powder of silica gel to improve mechanical strength.

In the optical recording medium 1 having the above-described configuration, when the inorganic recording layer 41 is irradiated with laser light, the Mn oxide is heated and decomposed due to the laser light, and emits oxygen. Accordingly, a bubble is generated at a portion irradiated with the laser light. With this configuration, it is possible to carry out irreversible recording of an information signal.

[1.2 Method of Manufacturing Optical Recording Medium]

Next, description will be given of an example of a method of manufacturing the optical recording medium according to the first embodiment of the present technology.

(Process of Preparing First Disc)

The first disc 10 is prepared as follows.

(Substrate Molding Process)

First, the substrate 11 in which a uneven surface is formed on one main surface is molded. As a method of molding the substrate 11, for example, injection molding method, a photopolymer method (2P method: photo polymerization), and the like can be used.

(Process of Forming Information Signal Layer)

Next, for example, the information signal layer L0 is formed by sequentially laminating the dielectric layer 43, the inorganic recording layer 41, and the dielectric layer 42 on the substrate 11 by a sputtering method. Hereinafter, the process of forming the dielectric layer 43, the inorganic recording layer 41, and the dielectric layer 42 will be described in detail.

(Process of Forming Dielectric Layer)

First, the substrate 11 is conveyed into a vacuum chamber provided with a target including a dielectric material as a main component, and the inside of the vacuum chamber is evacuated until reaching a predetermined pressure. Then, the target is sputtered while introducing a process gas such as an Ar gas or an $O_2$ gas into the vacuum chamber, thereby forming the dielectric layer 43 on the substrate 11. As a sputtering method, for example, a radio frequency (RF) sputtering method or a direct current (DC) sputtering method can be used, and the direct current sputtering method is particularly preferable. The reason for this is as follows. A film formation rate of the direct current sputtering method is higher in comparison to the radio frequency sputtering method, and thus it is possible to improve productivity.

(Process of Forming Inorganic Recording Layer)

Next, the substrate 11 is conveyed into a vacuum chamber provided with a target for formation of the inorganic recording layer, and the inside of the vacuum chamber is evacuated until reaching a predetermined pressure. Then, the target is sputtered while introducing a process gas such as an Ar gas or an $O_2$ gas into the vacuum chamber, thereby forming the inorganic recording layer 41 on the dielectric layer 43.

Here, the target for forming the inorganic recording layer includes, for example, a ternary-compound-system oxide of the oxide of the metal A, the oxide of the metal B, and the oxide of the metal C as a main component. Ratios of the metal A, the metal B, and the metal C which are included in the ternary-compound-system oxide satisfy a relationship of 0.46≤x1, and preferably 0.46≤x1≤1.70. Furthermore, as described above, x1 is a variable that is defined by x1=a/(b+0.8c).

It is preferable that the ternary-compound-system oxide of the target for forming the inorganic recording layer has a composition similar to the composition of the inorganic recording layer 41.

In addition, the inorganic recording layer 41 may be formed by a reactive sputtering with at least oxygen. In this case, a target for the optical recording medium includes the metal A, the metal B, and the metal C as a main component, and ratios of the metal A, the metal B, and the metal C satisfy a relationship of 0.46≤x1, and preferably 0.46≤x1≤1.70. Furthermore, as described above, x1 is a variable that is defined by x1=a/(b+0.8c).

(Process of Forming Dielectric Layer)

Next, the substrate 11 is conveyed into a vacuum chamber provided with a target including a dielectric material as a main component, and the inside of the vacuum chamber is evacuated until reaching a predetermined pressure. Then, the target is sputtered while introducing a process gas such as an Ar gas or an $O_2$ gas into the vacuum chamber, thereby forming the dielectric layer 42 on the inorganic recording layer 41. As a sputtering method, for example, the radio frequency (RF) sputtering method or the direct current (DC) sputtering method can be used, and the direct current sputtering method is particularly preferable. The reason for this is as follows. A film formation rate of the direct current sputtering method is higher in comparison to the radio frequency sputtering method, and thus it is possible to improve productivity.

Through the above-described processes, the information signal layer L0 is formed on the substrate 11.

(Process of Forming Spacer Layer)

Next, an ultraviolet curable resin is uniformly applied onto the information signal layer L0, for example, by a spin coating method. Then, a uneven pattern of a stamper is compressed to the ultraviolet curable resin that is uniformly applied onto the information signal layer L0, and the ultraviolet curable resin is irradiated with ultraviolet rays and is cured. Then, the stamper is peeled off. With this configuration, the uneven pattern of the stamper is transferred to the ultraviolet curable resin, and thus, for example, the spacer layer S1 in which the land Ld and the groove Gv are provided is formed on the information signal layer L0.

(Process of Forming Information Signal Layer and Spacer Layer)

Next, the information signal layer L1, the spacer layer S2, the information signal layer L3, . . . , the spacer layer Sn, and the information signal layer Ln are laminated on the spacer layer S1 in this order in a similar manner as in the process of forming the information signal layer L0 and the spacer layer S1. At this time, a film thickness, a composition, and the like of each of the dielectric layer 43, the inorganic recording layer 41, and the dielectric layer 42, which constitute the information signal layers L1 to Ln, may be appropriately adjusted by appropriately adjusting film-formation conditions, a target composition, and the like. In addition, the thickness of each of the spacer layers S2 to Sn may be appropriately adjusted by appropriately adjusting conditions of the spin coating method.

(Process of Forming Light-Transmitting Layer)

Next, a photosensitive resin such as an ultraviolet curable resin (UV resin) is spin-coated on the information signal layer Ln, for example, by a spin coating method, and the photosensitive resin is irradiated with light such as ultraviolet rays to be cured. With this process, the light-transmitting layer 12 is formed on the information signal layer Ln. Through the above-described processes, the first disc 10 is prepared.

(Process of Preparing Second Disc)

A process of preparing the second disc is similar to the process of preparing the first disc, and thus description thereof will be omitted.

(Joining Process)

Next, an ultraviolet curable resin as an adhesive is stretched between the first and second discs 10 and 20, which are prepared as described above, by the spin coating method as follows. First, the ultraviolet curable resin is applied to a main surface, which is opposite to the second light irradiation surface C2, between both main surfaces of the second disc 20 in a ring shape along a peripheral edge of a center hole. Next, a main surface, which is opposite to the first light irradiation surface C1, between both main surfaces of the first disc 10, and a main surface, which is opposite to the second light irradiation surface C2, between both surfaces of the second disc 20 are made to face each other, and the first disc 10 is compressed to the second disc 20 through the ultraviolet curable resin.

Next, the first and second discs 10 and 20 are rotated to stretch the ultraviolet curable resin between the first and second discs 10 and 20 in a radial direction of the first and second discs 10 and 20. At this time, the thickness of the ultraviolet curable resin is adjusted to be a predetermined thickness by a rotation speed. With this configuration, in the first and second discs 10 and 20, the ultraviolet curable resin is delivered from the inner periphery of the first and second discs 10 and 20 to the outer periphery thereof. Through the above-described processes, uncured optical recording medium is obtained.

Furthermore, in the process of stretching the ultraviolet curable resin, it is preferable that the outer peripheral portion of the first and second discs 10 and 20 is irradiated with ultraviolet rays, and the ultraviolet curable resin that is stretched to the outer peripheral portion is temporarily cured. With this configuration, it is possible to suppress occurrence of opening at the outer peripheral portion of the first and second discs 10 and 20.

Next, the uncured optical recording medium prepared as described above is joined as follows. That is, the ultraviolet curable resin is irradiated with ultraviolet rays from both surface sides of the uncured optical recording medium by an ultraviolet lamp, thereby curing the ultraviolet curable resin. With this configuration, the desired optical recording medium 1 is obtained.

[1.3 Effect]

The optical recording medium according to the first embodiment includes two or more inorganic recording layers 41, among the two or more inorganic recording layers 41, at least one layer other than a layer on the deepest side from the first and second light irradiation surfaces C1 and C2 includes the oxide of the metal A, the oxide of the metal B, and the oxide of the metal C as a main component. The metal A is at least one kind among W, Mo, and Zr, the metal B is Mn, and the metal C is at least one kind among Cu, Ag, and Ni. The ratios of the metal A, the metal B, and the metal C, which are respectively included in the oxide of the metal A, the oxide of the metal B, and the oxide of the metal C, satisfy a relationship of $0.46 \leq x1$. With this configuration, it is possible to realize the inorganic recording layer 41 having excellent transmission characteristics and satisfactory recording characteristics, and the optical recording medium 1 including the inorganic recording layer 41 at a lost cost.

2 Second Embodiment

[2.1 Configuration of Optical Recording Medium]

An optical recording medium 1 according to a second embodiment is different from the optical recording medium 1 according to the first embodiment in that at least one layer of the inorganic recording layer 41 in the information signal layers L1 to Ln and L1 to Lm other than the information signal layer L0 that is located on the deepest side from the first and second light irradiation surfaces C1 and C2 includes a quaternary-compound-system oxide in which an oxide of a metal D is added to the ternary-compound-system oxide of the first embodiment as a main component. A configuration of the information signal layers L0 to Lm is similar to a configuration of the information signal layer L0 to Ln, and thus, hereinafter, description will be given of only a configuration of the information signal layers L0 to Ln.

The metal D is at least one kind between Zn and Mg. A ratio of the metal A, the metal B, the metal C, and the metal D, which are respectively included in the oxide of the metal A, the oxide of the metal B, the oxide of the metal C, and the oxide of the metal D, satisfies a relationship of 0.46≤x2, and preferably 0.46≤x2≤1.70.

Here, x2 is a variable that is defined by x2=(0.1d+a)/(b+0.8c).

a: Atomic ratio [atom %] of the metal A with respect to the sum of the metal A, the metal B, the metal C, and the metal D b: Atomic ratio [atom %] of the metal B with respect to the sum of the metal A, the metal B, the metal C, and the metal D c: Atomic ratio [atom %] of the metal C with respect to the sum of the metal A, the metal B, the metal C, and the metal D d: Atomic ratio [atom %] of the metal D with respect to the sum of the metal A, the metal B, the metal C, and the metal D In a case where the metal A is W and the metal D is Zn, an optimal recording power difference before and after aging can be suppressed by reducing the atomic ratio a of W, and thus a long operational lifespan with respect to recording is accomplished. In addition, in a case where the metal A is W and the metal D is Zn, it is preferable that the atomic ratio d of Zn in the inorganic recording layer 41 is equal to or greater than the atomic ratio a of W in the inorganic recording layer 41 to reduce signal noise.

From the viewpoint of increasing the amount of light that reaches the information signal layer L0 that is located on the deepest side from the first light irradiation surface C1, it is preferable that all of the inorganic recording layers 41 in the information signal layers L1 to Ln other than the information signal layer L0 includes the quaternary-compound-system oxide as a main component, and the above-described relationship (0.46≤x2) is satisfied. In addition, it is preferable that the value of the variable x2 of the inorganic recording layers 41 of the information signal layers L1 to Ln is larger as the information signal layer L is closer to the first light irradiation surface C1. The reason for this is because a transmittance can be set to be higher as the information signal layer L is closer to the first light irradiation surface C1.

In addition, from the viewpoint of satisfactory signal characteristics, a high recording power margin, high reproduction durability, a long operational lifespan, and the like, it is preferable that all of the inorganic recording layers 41 of the information signal layers L0 to Ln include the quaternary-compound-system oxide as a main compound, and the above-described relationship is satisfied. In addition, typically, higher recording sensitivity is necessary for the information signal layer L that is closer to the deepest layer, and thus a transmittance is likely to be lowered. According to this, the information signal layer L, which is closer to the first light irradiation surface C1, is designed to have a higher transmittance in many cases. Accordingly, it is preferable that a value of the variable x2 of the inorganic recording layers 41 of the information signal layers L1 to Ln is larger as the information signal layer L is closer to the first light irradiation surface C1.

The atomic ratio a of the metal A with respect to the sum of the metal A, the metal B, the metal C, and the metal D is preferably in a range of 20 atom % to 40 atom %, and more preferably in a range of 20 atom % to 36 atom %. When the atomic ratio a is less than 20 atom %, the transmittance tends to be lowered. On the other hand, when the atomic ratio a is greater than 40 atom %, recording sensitivity tends to decrease, or optimal recording power difference before and after aging tends to increase.

The atomic ratio b of the metal B with respect to the sum of the metal A, the metal B, the metal C, and the metal D is preferably in a range of 5 atom % to 30 atom %, and more preferably in a range of 8 atom % to 26 atom %. When the atomic ratio b is less than 5 atom %, the recording power margin tends to be narrowed. On the other hand, when the atomic ratio b is greater than 30 atom %, the transmittance tends to be lowered.

The atomic ratio c of the metal C with respect to the sum of the metal A, the metal B, the metal C, and the metal D is preferably in a range of 5 atom % to 40 atom %, and more preferably in a range of 5 atom % to 40 atom %. When the atomic ratio c is less than 5 atom %, productivity tends to decrease due to a decrease in film-formation rate, or the reproduction durability tends to be weak. On the other hand, when the atomic ratio c is greater than 40 atom %, the transmittance tends to be lowered.

The atomic ratio d of the metal D with respect to the sum of the metal A, the metal B, the metal C, and the metal D is preferably in a range of 20 atom % to 70 atom %, and more preferably in a range of 22 atom % to 61 atom %. When the atomic ratio d is less than 20 atom %, in a case where the metal A includes W, a symbol error rate (SER) tends to deteriorate. On the other hand, when the atomic ratio d is greater than 70 atom %, durability under an environment of a high temperature and a high humidity tends to be weak.

As the material of the inorganic recording layer 41 other than the quaternary-compound-system oxide in the information signal layers L1 to Ln, for example, a mixture of an In oxide and a Pd oxide, or a mixture of a W oxide and a Pd oxide can also be used. However, it is preferable to use the quaternary-compound-system oxide that does not include Pd that is a noble metal as the material of the inorganic recording layer 41 from the viewpoint of a reduction in the cost of the optical recording medium 1.

As the material of the inorganic recording layer 41 of the information signal layer L0 that is located on the deepest side from the first light irradiation surface C1, the mixture of the In oxide and the Pd oxide or the mixture of the W oxide and the Pd oxide can also be used. However, as the material of the inorganic recording layer 41, it is preferable to use the quaternary-compound-system oxide from the viewpoint of a reduction in the cost.

In a case where the number of the information signal layers L of the first and second discs 10 and 20 is three, as the information signal layers L0 to L2, it is preferable to use information signal layers having the following configuration in combination with each other. In the inorganic recording layer 41 of the information signal layer L1 in which high sensitivity is obtained and is close to the deepest layer in which the value of x2 becomes a small value, Mn or Cu is likely to be rich, and thus a transmittance variation after recording is likely to be enlarged. According to this, it is preferable to use a layer having an extinction coefficient of 0.05 or greater as the dielectric layers 42 and 43 to suppress the transmittance variation. In addition, in the inorganic recording layer 41 of the information signal layer L2 in which a high transmittance is obtained, and x2 becomes a large value, the transmittance variation after recording is small, but the power margin is likely to be narrowed.

Accordingly, it is preferable to use a layer including SIZ or IGZO as the dielectric layers 42 and 43 to secure the power margin.

In a case where the metal A is W and the metal D is Zn, it is preferable that the atomic ratio of Zn in the inorganic recording layer 41 is equal to or greater than the atomic ratio of W in the inorganic recording layer 41. With this configuration, it is possible to reduce the SER.

(Information Signal Layer L0)
Dielectric layer 42: SIZ
Inorganic recording layer 41: WZCMO ($0.3 \leq x2 \leq 0.5$)
Dielectric layer 43: ITO
(Information Signal Layer L1)
Dielectric layer 42: SIZ
Inorganic recording layer 41: WZCMO ($0.6 \leq x2 \leq 1.0$)
Dielectric layer 43: SIZ
(Information Signal Layer L2)
Dielectric layer 42: SIZ
Inorganic recording layer 41: WZCMO ($0.9 \leq x2 \leq 1.4$)
Dielectric layer 43: SIZ In this specification, "WZCMO" represents a mixture including four components including the W oxide, the Zn oxide, the Cu oxide, and the Mn oxide.

[2.2 Method of Manufacturing Optical Recording Medium]

A method of manufacturing the optical recording medium according to the second embodiment of the present technology is similar to the method of manufacturing the optical recording medium according to the first embodiment except for a process of forming the inorganic recording layer. Accordingly, hereinafter, description will be given of only the process of forming the inorganic recording layer.

(Process of Forming Inorganic Recording Layer)

Next, the substrate 11 is conveyed into a vacuum chamber provided with a target for forming the inorganic recording layer, and the inside of the vacuum chamber is evacuated until reaching a predetermined pressure. Then, the target is sputtered while introducing a process gas such as an Ar gas or an $O_2$ gas into the vacuum chamber, thereby forming the inorganic recording layer 41 on the dielectric layer 43.

Here, the target for forming the inorganic recording layer includes a quaternary-compound-system oxide obtained by adding the oxide of the metal D to the ternary-compound-system oxide of the first embodiment as a main component. A ratio of the metal A, the metal B, the metal C, and the metal D which are included in the quaternary-compound-system oxide satisfies a relationship of $0.46 \leq x2$, and preferably $0.46 \leq x2 \leq 1.70$. Furthermore, as described above, x2 is a variable that is defined by $x2=(0.1d+a)/(b+0.8c)$.

It is preferable that the quaternary-compound-system oxide of the target for forming the inorganic recording layer has a composition similar to the composition of the inorganic recording layer 41.

In addition, the inorganic recording layer 41 may be formed by a reactive sputtering with at least oxygen. In this case, a target for the optical recording medium includes the metal A, the metal B, the metal C, and the metal D as a main component, and a ratio of the metal A, the metal B, the metal C, and the metal D satisfies a relationship of $0.46 \leq x2$, and preferably $0.46 \leq x2 \leq 1.70$. Furthermore, as described above, x2 is a variable that is defined by $x2=a/(b+0.8c)$.

[2.3 Effect]

The optical recording medium 1 according to the second embodiment includes two or more inorganic recording layers 41, among the two or more inorganic recording layers 41, at least one layer other than a layer on the deepest side from the first and second light irradiation surfaces C1 and C2 includes the quaternary-compound-system oxide obtained by adding the oxide of the metal D to the ternary-compound-system oxide of the first embodiment as a main component. In addition, the ratio of the metal A, the metal B, the metal C, and the metal D, which are respectively included in the oxide of the metal A, the oxide of the metal B, the oxide of the metal C, and the oxide of the metal D, satisfies a relationship of $0.46 \leq x2$. With this configuration, it is possible to lower a total amount of the metal oxides other than the oxide of the metal D while satisfying characteristics obtained as the information signal layer L of the optical recording medium 1 and maintaining excellent transmission characteristics.

EXAMPLES

Hereinafter, the present technology will be described in detail with reference to examples, but the present technology is not limited to the following examples.

In the following description, the information signal layers of the multi-layer optical recording medium are described as "L0 layer" and "L1 layer" in this order from a substrate side toward a laser light irradiation surface side.

In Examples, description will be given in the following order i Composition of Inorganic Recording Layer
ii Optical Film Thickness of Dielectric Layer
iii Ratio of Zn and W Included in Inorganic Recording Layer i Composition of Inorganic Recording Layer Examples 1 to 7 and Comparative Example 1

First, a polycarbonate substrate having a thickness of 1.1 mm was molded by injection molding. Furthermore, a uneven surface including a land and a groove was formed on the polycarbonate substrate. In addition, a track pitch Tp between the land and the groove was set to 0.225 nm. Next, a first dielectric layer, an inorganic recording layer, and a second dielectric layer are sequentially laminated on the uneven surface of the polycarbonate substrate by a sputtering method to prepare the L0 layer. Here, the L0 layer is set as the L0 layer for a two-layer optical recording medium.

Hereinafter, a detailed configuration of the L0 layer will be described below.
Second Dielectric Layer (Spacer Layer Side)
Material: SIZ, thickness: 10 nm
Inorganic Recording Layer
Material: WZCMO, thickness: 30 nm
Compositional ratio: a=21, b=26, c=22, and d=25
First Dielectric Layer (Substrate Side)
Material: ITO, thickness: 10 nm Next, an ultraviolet curable resin (manufactured by Dexerials Corporation, trade name: SK5500B) was uniformly applied onto the L0 layer by a spin coating method, and an uneven pattern of a stamper was compressed to the ultraviolet curable resin that was applied onto the L0 layer, the ultraviolet curable resin was irradiated with ultraviolet rays to be cured, and then the stamper was peeled off, thereby forming a spacer layer that includes a uneven surface having a land and a groove, and has a thickness of 25 µm. Furthermore, a track pitch Tp between the land and the groove was set to 0.225 nm.

Next, a first dielectric layer, an inorganic recording layer, and a second dielectric layer were sequentially laminated on the uneven surface of the spacer layer, thereby preparing the L1 layer.

A detailed configuration of respective layers was set as follows.

Second Dielectric Layer (Light-Transmitting Layer Side)
Material: SIZ, thickness: 10 nm
Inorganic Recording Layer
Material: Ternary-composition-system metal oxide (the oxide of the metal A, the oxide of the metal B, and the oxide of the metal C) illustrated in Table 1, thickness: 30 nm
Atomic ratio (compositional ratio): atomic ratios a, b, and c illustrated in Table 2
First Dielectric Layer (Spacer Layer Side)
Material: SIZ, thickness: 10 nm Next, an ultraviolet curable resin (Dexerials Corporation, trade name: SK8300) was uniformly applied onto the second dielectric layer by a spin coating method, the ultraviolet curable resin was irradiated with ultraviolet rays to be cured, thereby forming an light-transmitting layer having a thickness of 75 μm. Through the above-described processes, a desired land/grove recording type two-layer optical recording medium was obtained.

Examples 8 to 23, and Comparative Examples 2 to 4

Two-layer optical recording media were obtained in a similar manner as in Example 1 except that a material and a compositional ratio of the inorganic recording layer of the L1 layer were changed as follows.

Inorganic Recording Layer
Material: Quaternary-composition-system metal oxide (the oxide of the metal A, the oxide of the metal B, the oxide of the metal C, and the oxide of the metal D) as illustrated in Table 1, thickness: 30 nm
Atomic ratio (compositional ratio): Atomic ratios a, b, c, and d illustrated in Table 2

(Evaluation)

The following evaluation was performed with respect to the optical recording media obtained as described above.

(Measurement of Transmittance)

First, a sample for calculation of a transmittance was prepared as follows. First, the L0 layer (L0 layer for the two-layer optical recording medium) was formed on the uneven surface of the polycarbonate substrate in a similar manner as in Example 1. Next, an ultraviolet curable resin (Dexerials Corporation, trade name: SK8300) was uniformly applied onto the second dielectric layer by a spin coating method, the ultraviolet curable resin was irradiated with ultraviolet rays to be cured, thereby forming an light-transmitting layer having a thickness of 100 μm. Through the above-described processes, a single-layer optical recording medium was obtained as a sample for calculation of a transmittance.

Next, a reflectance of the single-layer optical recording media obtained as described was measured by using a disc tester (manufactured by PULSTEC INDUSTRIAL CO., LTD., trade name: ODU-1000) under conditions of NA=0.85, and a recording wavelength of 405 nm. As a result, it could be understood that the reflectance was 11%.

Next, a reflectance R of the L0 layer of the two-layer optical recording media obtained as described above was measured by using the disc tester (manufactured by PULSTEC INDUSTRIAL CO., LTD., trade name: ODU-1000) under conditions of NA=0.85, and a recording wavelength of 405 nm.

Next, a transmittance T of the L1 layer was obtained through calculation using the following Expression (1).

$$R = 11\% \text{ (Reflectance of the L0 layer alone)} \times T^2 \quad (1)$$

(Recording Sensitivity Measuring Method)

With respect to the L1 layer of the two-layer optical recording media, 1-7 modulated data with 50 GB density per layer was recorded on the land and groove by using the disc tester (manufactured by PULSTEC INDUSTRIAL CO., LTD., trade name: ODU-1000) under conditions of a recording wavelength of 405 nm and a recording linear velocity of 14.00 m/s (corresponding to 4× speed), and was passed through a cross-talk canceller to reproduce the data, thereby obtaining SER. Recording power at which the SER became the minimum value was set as recording sensitivity. The recording sensitivity is preferably 25 mW or less. The reason for this is as follows. When the recording sensitivity is greater than 25 mW, in a case of recording an information signal at a recording linear velocity of 35.0 m/s (corresponding to 10× speed), recording power of 60 mW or greater is necessary, and thus recording is difficult with a current semiconductor laser.

(Overall Determination)

Overall determination of characteristics of the optical recording medium was performed on the following reference on the basis of the evaluation results of the transmittance and the recording sensitivity. The determination results were described as symbols ○, Δ, and x in Table 2.

○: The transmittance was 55% or greater, and the recording sensitivity was 25 mW or less.

Δ: The transmittance was 55% or greater, and the recording sensitivity was greater than 25 mW.

x: The transmittance was less than 55%.

Furthermore, when the transmittance of the L1 layer is less than 55%, the reflectance of the L0 layer decreases, and reproduction may be difficult in a consumer drive device, or error correction may be difficult. Here, the "reflectance of the L0 Layer" represents a reflectance of the L0 layer in a state of the two-layer optical recording medium (that is, a reflectance of the L0 layer viewed from a light irradiation surface) instead of a reflectance of the L0 layer in a single-layer state.

(Results)

Table 1 and Table 2 illustrate configurations of the optical recording media and evaluation results of Examples 1 to 23, and Comparative Examples 1 to 4.

TABLE 1

|  | Metal A | | | Metal B | Metal C | | | Metal D | |
| --- | --- | --- | --- | --- | --- | --- | --- | --- | --- |
|  | W [at %] | Mo [at %] | Zr [at %] | Mn [at %] | Cu [at %] | Ag [at %] | Ni [at %] | Zn [at %] | Mg [at %] |
| Example 1 | 33 | 0 | 0 | 30 | 37 | 0 | 0 | 0 | 0 |
| Example 2 | 38 | 0 | 0 | 25 | 37 | 0 | 0 | 0 | 0 |
| Example 3 | 48 | 0 | 0 | 15 | 37 | 0 | 0 | 0 | 0 |
| Example 4 | 58 | 0 | 0 | 5 | 37 | 0 | 0 | 0 | 0 |
| Example 5 | 68 | 0 | 0 | 5 | 27 | 0 | 0 | 0 | 0 |

TABLE 1-continued

|  | Metal A | | | Metal B | Metal C | | | Metal D | |
|---|---|---|---|---|---|---|---|---|---|
|  | W [at %] | Mo [at %] | Zr [at %] | Mn [at %] | Cu [at %] | Ag [at %] | Ni [at %] | Zn [at %] | Mg [at %] |
| Example 6 | 0 | 38 | 0 | 25 | 37 | 0 | 0 | 0 | 0 |
| Example 7 | 0 | 38 | 0 | 25 | 27 | 10 | 0 | 0 | 0 |
| Comparative Example 1 | 23 | 0 | 0 | 40 | 37 | 0 | 0 | 0 | 0 |
| Example 8 | 20 | 0 | 0 | 20 | 25 | 11 | 0 | 24 | 0 |
| Example 9 | 21 | 0 | 0 | 26 | 22 | 6 | 0 | 25 | 0 |
| Example 10 | 10 | 10 | 0 | 22 | 28 | 6 | 0 | 24 | 0 |
| Example 11 | 0 | 20 | 0 | 22 | 28 | 6 | 0 | 24 | 0 |
| Example 12 | 24 | 0 | 0 | 16 | 17 | 11 | 0 | 32 | 0 |
| Example 13 | 14 | 10 | 0 | 18 | 20 | 6 | 0 | 32 | 0 |
| Example 14 | 14 | 10 | 10 | 18 | 20 | 6 | 0 | 22 | 0 |
| Example 15 | 6 | 18 | 10 | 14 | 20 | 6 | 0 | 26 | 0 |
| Example 16 | 24 | 0 | 0 | 10 | 17 | 11 | 0 | 38 | 0 |
| Example 17 | 6 | 21 | 7 | 11 | 16 | 0 | 5 | 22 | 12 |
| Example 18 | 24 | 0 | 0 | 11 | 14 | 9 | 0 | 42 | 0 |
| Example 19 | 6 | 21 | 0 | 16 | 16 | 0 | 0 | 29 | 12 |
| Example 20 | 19 | 10 | 0 | 16 | 16 | 0 | 0 | 29 | 10 |
| Example 21 | 14 | 15 | 7 | 11 | 14 | 9 | 5 | 25 | 0 |
| Example 22 | 6 | 12 | 15 | 13 | 16 | 0 | 0 | 23 | 15 |
| Example 23 | 23 | 0 | 0 | 8 | 8 | 0 | 0 | 46 | 15 |
| Comparative Example 2 | 11 | 0 | 0 | 33 | 28 | 0 | 0 | 28 | 0 |
| Comparative Example 3 | 20 | 0 | 0 | 38 | 16 | 6 | 0 | 20 | 0 |
| Comparative Example 4 | 23 | 0 | 0 | 40 | 22 | 0 | 0 | 15 | 0 |

TABLE 2

|  | Metal A a [at %] | Metal B b [at %] | Metal C c [at %] | Metal D d [at %] | Sum (a + b + c + d) | x ($x_1$, $x_2$) | Transmittance [%] | Recording sensitivity [mW] | Overall determination |
|---|---|---|---|---|---|---|---|---|---|
| Example 1 | 33 | 30 | 37 | 0 | 100 | 0.55 | 58.70 | 13.0 | ○ |
| Example 2 | 38 | 25 | 37 | 0 | 100 | 0.70 | 64.27 | 14.0 | ○ |
| Example 3 | 48 | 15 | 37 | 0 | 100 | 1.08 | 74.90 | 17.2 | ○ |
| Example 4 | 58 | 5 | 37 | 0 | 100 | 1.68 | 85.70 | 23.7 | ○ |
| Example 5 | 68 | 5 | 27 | 0 | 100 | 2.56 | 95.99 | 37.9 | Δ |
| Example 6 | 38 | 25 | 37 | 0 | 100 | 0.70 | 64.27 | 14.0 | ○ |
| Example 7 | 38 | 25 | 37 | 0 | 100 | 0.70 | 64.27 | 14.0 | ○ |
| Comparative Example 1 | 23 | 40 | 37 | 0 | 100 | 0.33 | 46.12 | 11.5 | X |
| Example 8 | 20 | 20 | 36 | 24 | 100 | 0.46 | 55.43 | 12.9 | ○ |
| Example 9 | 21 | 26 | 28 | 25 | 100 | 0.49 | 56.21 | 12.6 | ○ |
| Example 10 | 20 | 22 | 34 | 24 | 100 | 0.46 | 55.01 | 12.4 | ○ |
| Example 11 | 20 | 22 | 34 | 24 | 100 | 0.46 | 55.72 | 12.1 | ○ |
| Example 12 | 24 | 16 | 28 | 32 | 100 | 0.71 | 67.08 | 13.5 | ○ |
| Example 13 | 24 | 18 | 26 | 32 | 100 | 0.70 | 65.98 | 13.0 | ○ |
| Example 14 | 34 | 18 | 26 | 22 | 100 | 0.93 | 70.59 | 15.7 | ○ |
| Example 15 | 34 | 14 | 26 | 26 | 100 | 1.05 | 70.87 | 15.2 | ○ |
| Example 16 | 24 | 10 | 28 | 38 | 100 | 0.86 | 73.73 | 14.0 | ○ |
| Example 17 | 34 | 11 | 21 | 34 | 100 | 1.35 | 78.61 | 19.1 | ○ |
| Example 18 | 24 | 11 | 23 | 42 | 100 | 0.96 | 76.07 | 18.7 | ○ |
| Example 19 | 27 | 16 | 16 | 41 | 100 | 1.08 | 77.36 | 17.6 | ○ |
| Example 20 | 29 | 16 | 16 | 39 | 100 | 1.14 | 78.18 | 19.3 | ○ |
| Example 21 | 36 | 11 | 28 | 25 | 100 | 1.15 | 76.57 | 18.8 | ○ |
| Example 22 | 33 | 13 | 16 | 38 | 100 | 1.43 | 79.05 | 20.5 | ○ |
| Example 23 | 23 | 8 | 8 | 61 | 100 | 2.02 | 88.82 | 28.5 | Δ |
| Comparative Example 2 | 11 | 33 | 28 | 28 | 100 | 0.25 | 41.18 | 11.0 | X |
| Comparative Example 3 | 20 | 38 | 22 | 20 | 100 | 0.40 | 45.69 | 11.9 | X |
| Comparative Example 4 | 23 | 40 | 22 | 15 | 100 | 0.43 | 51.01 | 12.6 | X |

Figure 3:
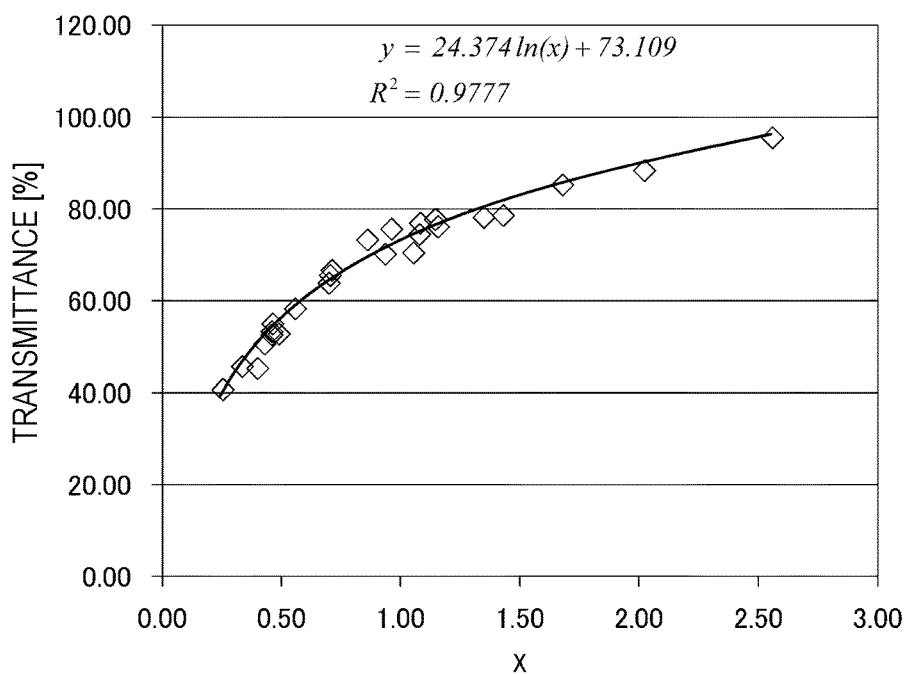
FIG. 3 is a graph illustrating a relationship between a variable x and a transmittance in optical recording media of Examples 1 to 23 and Comparative Examples 1 to 4.

FIG. 3 illustrates a relationship between a variable x and a transmittance in the optical recording media of Examples 1 to 23, and Comparative Examples 1 to 4. From Table 1, Table 2, and FIG. 3, it can be understood as follows. Along with an increase in x, the transmittance of the L1 layer tends to increase. When the variable x is 0.46 or greater, the transmittance can be 55% or greater. In addition, even when the variable x is 1.70 or less, the recording sensitivity can be improved.

ii Optical Film Thickness of Dielectric Layer

Examples 24 to 27

Two-layer optical recording media were obtained in a similar manner as in Example 1 except that the thickness of the first dielectric layer of the L1 layer was changed as illustrated in Table 3.

Examples 28 to 31

Two-layer optical recording media were obtained in a similar manner as in Examples 24 to 27 except that ITO illustrated in Table 3 was used as the material of the first dielectric layer.

(Tracking Offset Measuring Method)

With respect to the L1 layer of the two-layer optical recording media obtained as described above, a push-pull signal amplitude PPb was measured by using the disc tester (manufactured by PULSTEC INDUSTRIAL CO., LTD., trade name: ODU-1000). Next, 1-7 modulated data with 50 GB density per layer was recorded only on the land, only on the groove, or on both the land and the groove under conditions of a recording wavelength of 405 nm and a recording linear velocity of 14.00 m/s (correspond to 4× speed), and a push-pull signal amplitude PPa on the recorded signal was measured.

Next, a difference of the push-pull amplitude between a non-recording state and a recording state (tracking offset) was calculated by the following Expression (2).

$$\text{Tracking offset} = (PPb - PPa)/(PPb + PPa) \quad (2)$$

The tracking offset is preferably 20% or less. When the tracking offset is greater than 20%, tracking stability at a boundary between a recorded portion and a non-recorded portion deteriorates, and recording from the boundary between the recorded portion and the non-recorded portion may be difficult.

Next, characteristics of the optical recording media were determined on the following reference on the basis of the measurement results of the tracking offset. The determination results were described as symbols ○ and Δ in Table 3.

○: The tracking offset was 20% or less.

Δ: The tracking offset was greater than 20%.

(Results)

Figure 4:
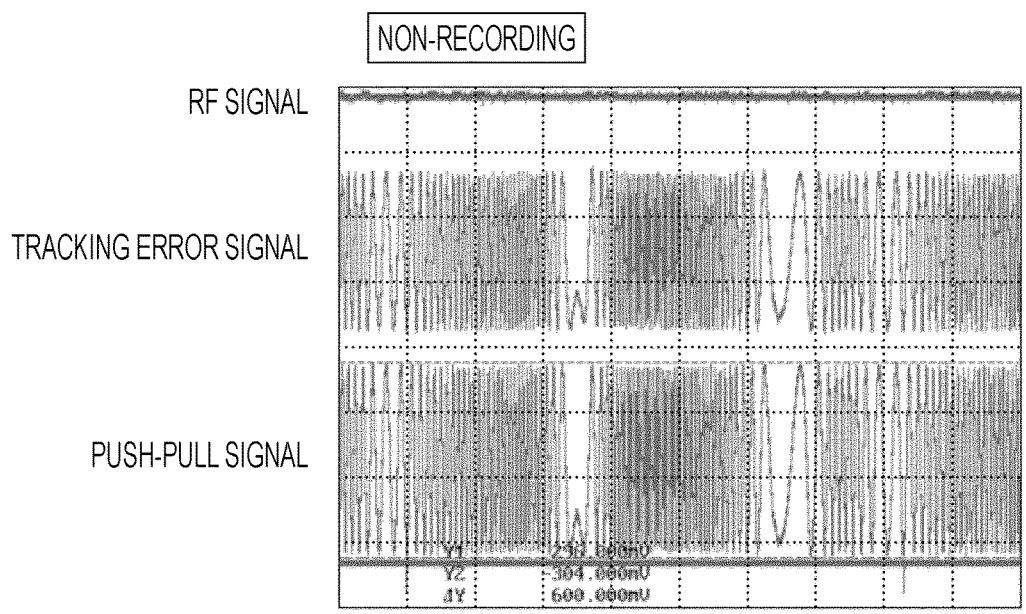
FIG. 4A is a view illustrating measurement results of various signals in an optical recording medium of Example 24 in a non-recorded state.
FIG. 4B is a view illustrating measurement results of various signals in the optical recording medium of Example 24 in a recorded state.
Figure 4:
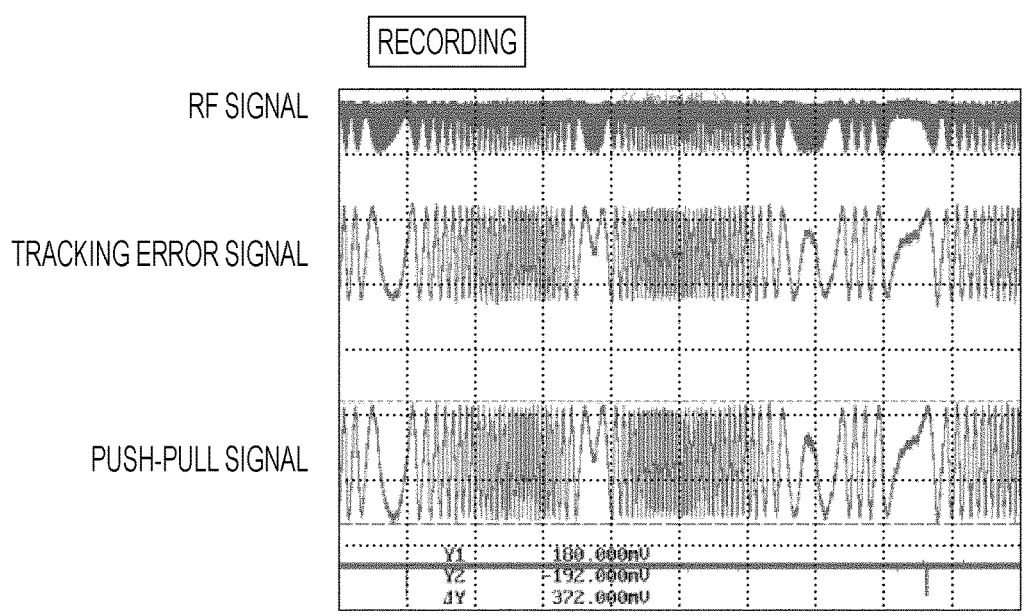
Figure 5:
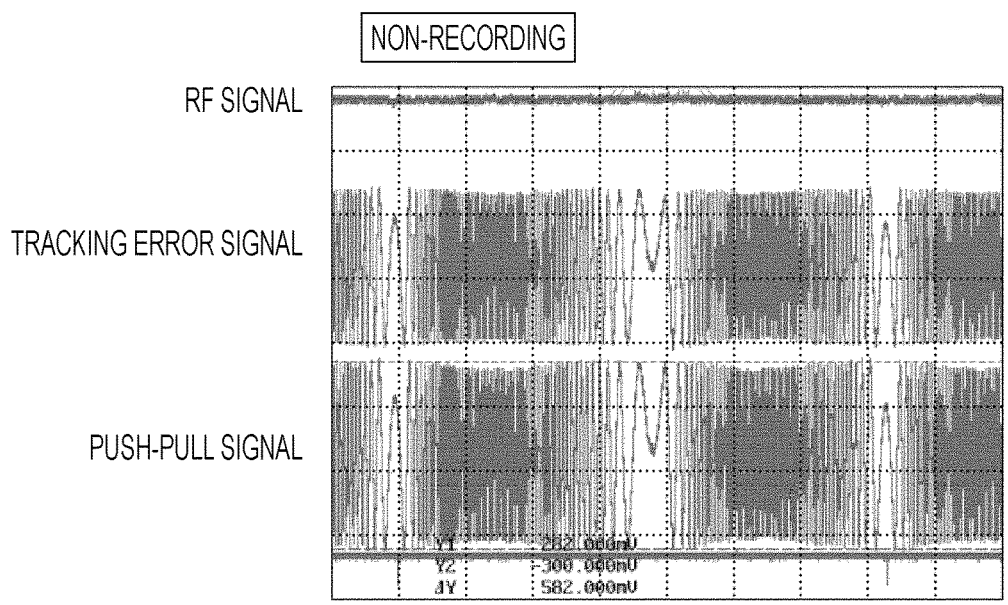
FIG. 5A is a view illustrating measurement results of various signals in an optical recording medium of Example 26 in a non-recorded state.
FIG. 5B is a view illustrating measurement results of various signals in the optical recording medium of Example 26 in a recorded state.
Figure 5:
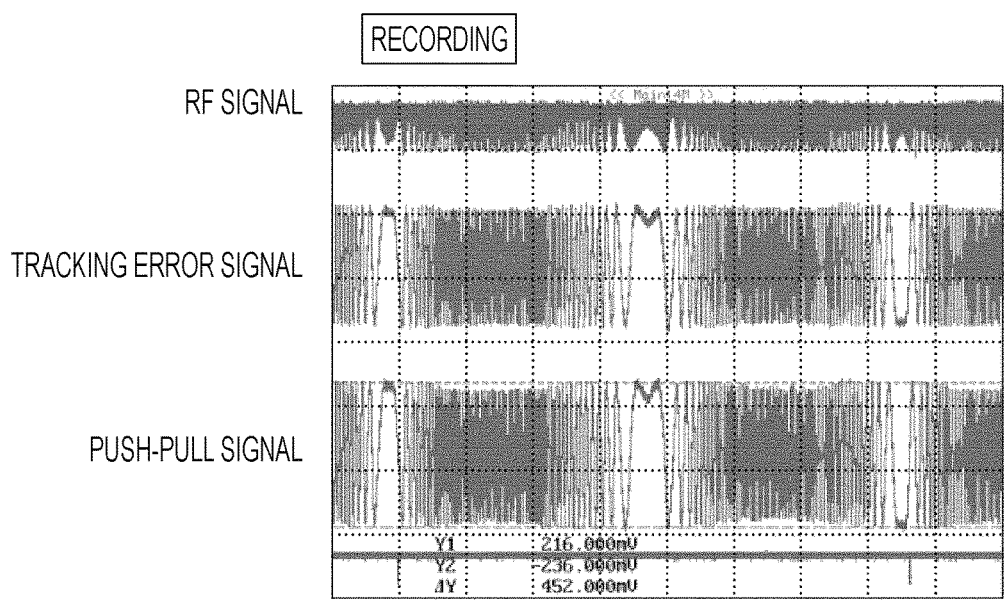

FIG. 3A and FIG. 3B illustrate measurement results of various signals in the optical recording medium of Example 24 before and after recording. FIG. 4A and FIG. 4B illustrate measurement results of various signals in the optical recording medium of Example 26. From the measurement results, it can be seen that in the optical recording medium of Example 26 in which a relationship of n×T≥32 nm is satisfied, it is possible to further reduce a difference of the push-pull signal before and after recording in comparison to the optical recording medium of Example 24 in which relationship of n×T≥32 nm is not satisfied.

Table 3 illustrates configurations and evaluation results of the optical recording media of Examples 24 to 31.

TABLE 3

| | Material of first dielectric layer | Refractive index n | Thickness T [nm] | Optical film thickness n × T [nm] | Tracking offset [%] | Determination |
|---|---|---|---|---|---|---|
| Example 24 | SiO$_2$—In$_2$O$_3$—ZrO$_2$ | 2 | 13 | 26 | 25 | Δ |
| Example 25 | SiO$_2$—In$_2$O$_3$—ZrO$_2$ | 2 | 16 | 32 | 18 | ○ |
| Example 26 | SiO$_2$—In$_2$O$_3$—ZrO$_2$ | 2 | 19 | 38 | 12 | ○ |
| Example 27 | SiO$_2$—In$_2$O$_3$—ZrO$_2$ | 2 | 22 | 44 | 8 | ○ |
| Example 28 | In$_2$O$_3$—Sn$_2$O$_3$ | 2.2 | 13 | 28.6 | 21 | Δ |
| Example 29 | In$_2$O$_3$—Sn$_2$O$_3$ | 2.2 | 16 | 35.2 | 14 | ○ |
| Example 30 | In$_2$O$_3$—Sn$_2$O$_3$ | 2.2 | 19 | 41.8 | 9 | ○ |
| Example 31 | In$_2$O$_3$—Sn$_2$O$_3$ | 2.2 | 22 | 48.4 | 6 | ○ |

From Table 3, it can be seen that it is possible to set the tracking offset to 20% or less when satisfying the relationship of n×T≥32 nm.

iii Ratio of Zn and W Included in Inorganic Recording Layer

Comparative Examples 5 and 6

Two-layer optical recording media were obtained in a similar manner as in Comparative Example 4 except that the atomic ratios a, b, and c of the inorganic recording layer were changed as illustrated in Table 4 and Table 5.

(SER Evaluation Method)

With respect to the L1 layer of the two-layer optical recording media obtained as described above, 1-7 modulated data with 50 GB density per layer was recorded on the land and groove by using the disc tester (manufactured by PULSTEC INDUSTRIAL CO., LTD., trade name: ODU-1000) under conditions of a recording wavelength of 405 nm and a recording linear velocity of 14.0 m/s (corresponding to 4× speed), and was passed through a cross-talk canceller to reproduce the data, thereby obtaining SER. Furthermore, an SER value of $2\times10^{-4}$ is an upper limit at which error correction can be made by a consumer drive device.

Next, characteristics of the optical recording media were determined on the following reference on the basis of evaluation results of the SER. The determination results were described as symbols ○ and Δ in Table 5.

○: SER is equal to or less than the SER value of $2\times10^{-4}$.
Δ: SER is greater than the SER value of than $2\times10^{-4}$.
(Results)

Table 4 and Table 5 illustrate configurations and evaluation results of the optical recording media of Examples 9 to 12, 14, and 19, and Comparative Examples 3 to 6.

TABLE 4

|  | Metal A | | | Metal B | Metal C | | | Metal D | |
| --- | --- | --- | --- | --- | --- | --- | --- | --- | --- |
|  | W [at %] | Mo [at %] | Zr [at %] | Mn [at %] | Cu [at %] | Ag [at %] | Ni [at %] | Zn [at %] | Mg [at %] |
| Comparative Example 5 | 28 | 0 | 0 | 40 | 22 | 0 | 0 | 10 | 0 |
| Comparative Example 4 | 23 | 0 | 0 | 40 | 22 | 0 | 0 | 15 | 0 |
| Comparative Example 6 | 20 | 0 | 0 | 40 | 22 | 0 | 0 | 18 | 0 |
| Comparative Example 3 | 20 | 0 | 0 | 38 | 22 | 0 | 0 | 20 | 0 |
| Example 9 | 21 | 0 | 0 | 26 | 28 | 0 | 0 | 25 | 0 |
| Example 10 | 10 | 10 | 0 | 22 | 28 | 6 | 0 | 24 | 0 |
| Example 11 | 0 | 20 | 0 | 22 | 34 | 0 | 0 | 24 | 0 |
| Example 12 | 24 | 0 | 0 | 16 | 17 | 11 | 0 | 32 | 0 |
| Example 14 | 14 | 10 | 10 | 18 | 20 | 6 | 0 | 22 | 0 |
| Example 19 | 6 | 21 | 0 | 16 | 16 | 0 | 0 | 29 | 12 |

TABLE 5

|  | Metal A a [at %] | Metal B b [at %] | Metal C c [at %] | Metal D d [at %] | Sum (a + b + c + d) | Zn − W [at %] | SER | SER determination |
| --- | --- | --- | --- | --- | --- | --- | --- | --- |
| Comparative Example 5 | 28 | 40 | 22 | 10 | 100 | −18 | 1.0E−03 | Δ |
| Comparative Example 4 | 23 | 40 | 22 | 15 | 100 | −8 | 8.0E−04 | Δ |
| Comparative Example 6 | 20 | 40 | 22 | 18 | 100 | −2 | 6.0E−04 | Δ |
| Comparative Example 3 | 20 | 38 | 22 | 20 | 100 | 0 | 4.0E−05 | ○ |
| Example 9 | 21 | 26 | 28 | 25 | 100 | 4 | 2.0E−05 | ○ |
| Example 10 | 20 | 22 | 34 | 24 | 100 | 14 | 3.0E−05 | ○ |
| Example 11 | 20 | 22 | 34 | 24 | 100 | 24 | 2.0E−05 | ○ |
| Example 12 | 24 | 16 | 28 | 32 | 100 | 8 | 4.0E−05 | ○ |
| Example 14 | 34 | 18 | 26 | 22 | 100 | 8 | 3.0E−05 | ○ |
| Example 19 | 27 | 16 | 16 | 41 | 100 | 23 | 2.0E−05 | ○ |

Furthermore, in the evaluation results of the SER in Table 5, description of "aE−b" represents $a\times10^{-b}$.

Figure 6:
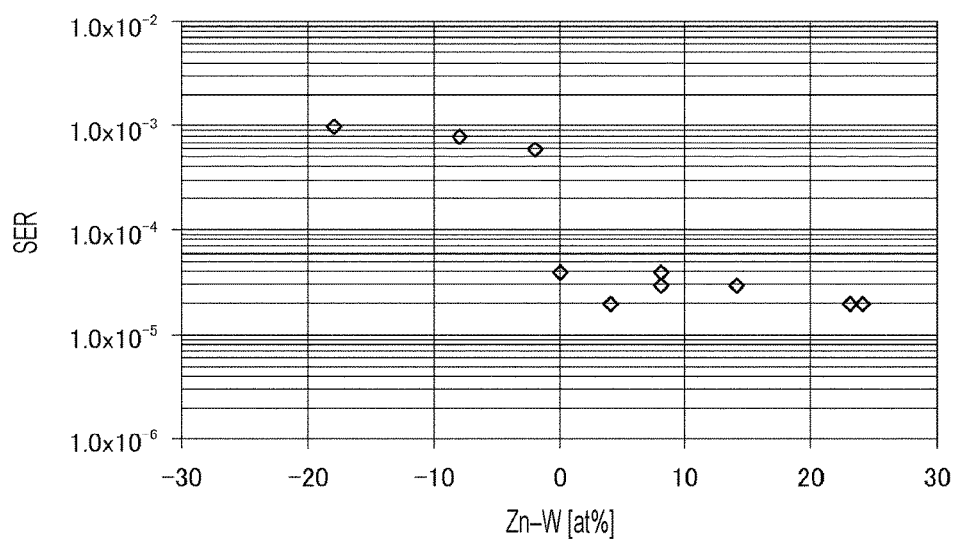
FIG. 6A is a graph illustrating SER measurement results in the optical recording media of Examples 9 to 12, 14, 19, and Comparative Examples 3 to 6.
FIG. 6B is a view illustrating measurement results of various signals in the optical recording medium of Comparative Example 4 in a non-recorded state.
Figure 6:
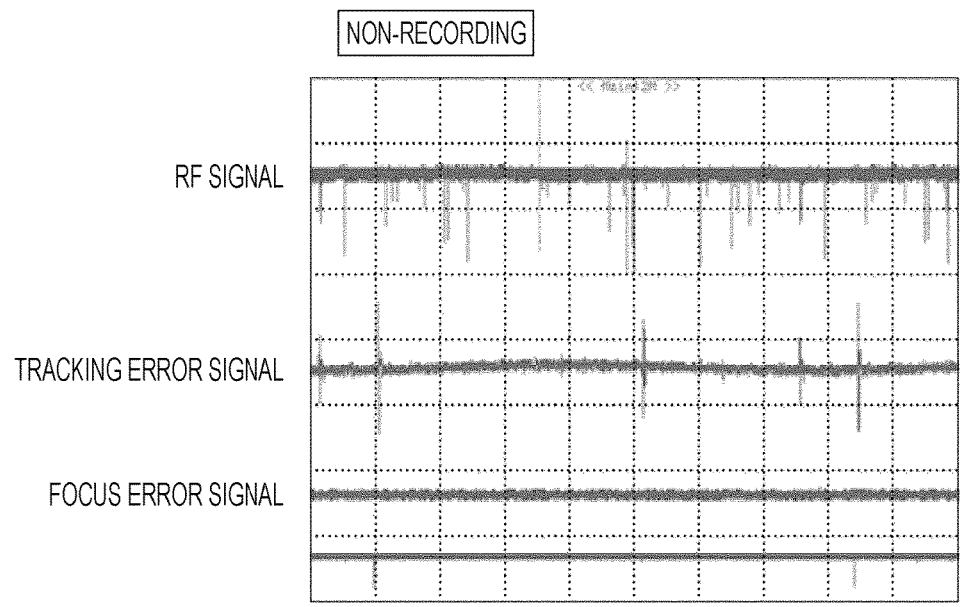

FIG. 6A illustrates SER measurement results in the optical recording media of Examples 9 to 12, 14, 19, and Comparative Examples 3 to 6. FIG. 6B illustrates measurement results of various signals of the optical recording medium of Comparative Example 4 in a non-recording state. From Table 4, Table 5, and FIG. 6A, in a case where the oxide of the metal A is a W oxide, and the oxide of the metal D is a Zn oxide, it can be seen that the atomic ratio of Zn in the inorganic recording layer is equal to or greater than an atomic ratio of W in the inorganic recording layer, and thus satisfactory SER can be set to be $2\times10^{-4}$ or less.

Hereinbefore, the embodiments of the present technology have been described in detail, but the present technology is not limited to the above-described embodiments, and various modifications can be made based on the technical sprit of the present technology.

For example, the configurations, the methods, the processes, the shapes, the materials, the numerical values, and the like which are exemplified in the above-described embodiments are illustrative only, and different configurations, methods, processes, shapes, materials, numerical values, and the like may be used according to necessity.

In addition, in the above-described embodiments, description has been given of a configuration in which the information signal layer includes the recording layer, the dielectric layer provided adjacently to the upper surface of the recording layer, and the dielectric layer provided adjacently to the lower surface of the recording layer, but the configuration of the information signal layer is not limited thereto. For example, the dielectric layer may be provided on any one side of the upper surface and the lower surface of the recording layer. In addition, the information signal layer may be constituted by only a single layer of the recording layer. In this simple configuration, it is possible to reduce the cost of the optical recording medium, and it is possible to improve productivity thereof. This effect becomes more significant in a medium in which the number of the information signal layers is greater.

In addition, in the above-described embodiments, as an example, description has been given of a case where the present technology is applied to an optical recording medium having a configuration in which the first and second discs are joined to each other through a joining layer, in which a plurality of information signal layers are irradiated with laser light from a light-transmitting layer side of the first and second discs to record and reproduce an information signal, but the present technology is not limited to the example. For example, the present technology is also applicable to an optical recording medium (for example, a BD) having a configuration in which a plurality of information signal layers, and a plurality of light-transmitting layers are laminated in this order on a substrate, in which the plurality of information signal layers are irradiated with laser light from the light-transmitting layer side to record or reproduce an information signal, an optical recording medium (for example, a CD) having a configuration in which a plurality of information signal layers and a plurality of protective layers are laminated in this order on a substrate, in which the plurality of information signal layers are irradiated with laser light from the substrate side to record or reproduce an information signal, or an optical recording medium (for example, a DVD) having a configuration in which a plurality of information signal layers are provided between two sheets of substrates, in which the plurality of information signal layers are irradiated with laser light from at least one substrate side to record or reproduce an information signal.

In addition, in the above-described embodiments, as an example, description has been given of a case where respective layers of the optical recording medium are formed by the sputtering method, but a film-formation method is not limited thereto, and another film-formation method may be used. Examples of the other film-formation method that can be used include physical vapor deposition method (PVD: a technology of aggregating a physically vaporized material on a substrate in a vacuum to form a thin film) such as vacuum vapor deposition, plasma assisted vapor deposition, sputtering, and an ion plating method, and the like in addition to chemical vapor deposition methods (CVD: technology of allowing a thin film to precipitate from a vapor phase by using a chemical reaction) such as thermal CVD, plasma CVD, and optical CVD.

In addition, in the above-described embodiment, description has been given of a case where all of the plurality of information signal layers have the same layer configuration, but the layer configuration may be changed in correspondence with characteristics (for example, optical characteristics, durability, and the like) which are obtained for every information signal layer. However, it is preferable that all of the information signal layers are set to have the same layer configuration from the viewpoint of productivity.

In addition, in the first embodiment, at least two layers among two or more recording layers may include the oxide of the metal A, the oxide of the metal B, and the oxide of metal C, and the relationship of $0.46 \leq x1$ may be satisfied. Since an information signal layer that is closer to the first or second light irradiation surface is designed to have a higher transmittance in many cases, in a case of employing the above-described configuration, it is preferable to satisfy a relationship in which the value of x1 is larger in a recording layer closer to the first or second light irradiation surface.

In addition, in the second embodiment, at least two layers among two or more recording layers may include the oxide of the metal A, the oxide of the metal B, the oxide of metal C, and the oxide of the metal D, and the relationship of $0.46 \leq x2$ may be satisfied. Since an information signal layer that is closer to the first or second light irradiation surface is designed to have a higher transmittance in many cases, in a case of employing the above-described configuration, it is preferable to satisfy a relationship in which the value of x2 is larger in a recording layer closer to the first or second light irradiation surface.

In addition, the present technology can employ the following configuration.

(1) An optical recording medium, including:
two or more recording layers; and
a light irradiation surface that is irradiated with light for recording an information signal on the two or more recording layers,
in which among the two or more recording layers, at least one layer other than a layer located on the deepest side from the light irradiation surface includes an oxide of a metal A, an oxide of a metal B, and an oxide of a metal C,
the metal A is at least one kind among W, Mo, and Zr, the metal B is Mn, and the metal C is at least one kind among Cu, Ag, and Ni, and
ratios of the metal A, the metal B, and the metal C satisfy a relationship of $0.46 \leq x1$ (provided that, $x1=a/(b+0.8c)$, a representing an atomic ratio [atom %] of the metal A with respect to the sum of the metal A, the metal B, and the metal C, b representing an atomic ratio [atom %] of the metal B with respect to the sum of the metal A, the metal B, and the metal C, and c representing an atomic ratio [atom %] of the metal C with respect to the sum of the metal A, the metal B, and the metal C).

(2) An optical recording medium, including:
two or more recording layers; and
a light irradiation surface that is irradiated with light for recording an information signal on the two or more recording layers,
in which among the two or more recording layers, at least one layer other than a layer located on the deepest side from the light irradiation surface includes an oxide of a metal A, an oxide of a metal B, an oxide of a metal C, and an oxide of a metal D,
the metal A is at least one kind among W, Mo, and Zr, the metal B is Mn, the metal C is at least one kind among Cu, Ag, and Ni, and the metal D is at least one kind of Zn and Mg, and
ratios of the metal A, the metal B, the metal C, and the metal D satisfy a relationship of $0.46 \leq x2$ (provided that, $x2=(0.1d+a)/(b+0.8c)$, a representing an atomic ratio [atom %] of the metal A with respect to the sum of the metal A, the metal B, the metal C, and the metal D, b representing an atomic ratio [atom %] of the metal B with respect to the sum of the metal A, the metal B, the metal C, and the metal D, c representing an atomic ratio [atom %] of the metal C with respect to the sum of the metal A, the metal B, the metal C, and the metal D, and d representing an atomic ratio [atom %] of the metal D with respect to the sum of the metal A, the metal B, the metal C, and the metal D).

(3) The optical recording medium according to (1) or (2), in which each of the recording layers includes a recessed track and a convex track, and
the information signal is capable of being recorded on both the recessed track and the convex track.

(4) The optical recording medium according to (3), in which a pitch between the recessed track and the convex track is 0.225 nm or less.

(5) The optical recording medium according to (3) or (4), further including:
a dielectric layer that is provided on a surface side, which is opposite to a side irradiated with light for recording or reproducing the information signal, between both surfaces of the recording layer, in which a refractive index n and the thickness T of the dielectric layer satisfy a relationship of n×T≥32 nm.

(6) The optical recording medium according to (2), in which the metal A is W, and the metal D is Zn, and an atomic ratio of Zn in each of the recording layers is equal to or greater than an atomic ratio of W in the recording layer.

(7) The optical recording medium according to (1), in which the metal A, the metal B, and the metal C satisfy a relationship of 0.46≤x1≤1.70.

(8) The optical recording medium according to (1), in which among the two or more recording layers, all of the recording layers other than the layer located on the deepest side from the light irradiation surface include the oxide of the metal A, the oxide of the metal B, and the oxide of the metal C, and the relationship of 0.46≤x1 is satisfied.

(9) The optical recording medium according to (8), in which a value of x1 becomes larger in a recording layer that is closer to the light irradiation surface.

(10) The optical recording medium according to (1), in which at least two layers among the two or more recording layers include the oxide of the metal A, the oxide of the metal B, and the oxide of the metal C, and the relationship of 0.46≤x1 is satisfied, and a relationship in which a value of x1 is greater in a recording layer that is closer to the light irradiation surface is satisfied.

(11) The optical recording medium according to any of (1) and (7) to (10), in which the atomic ratio a, the atomic ratio b, and the atomic ratio c satisfy relationships of 10≤a≤70, 2≤b≤40, and 5≤c≤50, respectively.

(12) The optical recording medium according to (2), in which the ratios of the metal A, the metal B, the metal C, and the metal D satisfy a relationship of 0.46≤x2≤1.70.

(13) The optical recording medium according to (2), in which among the two or more recording layers, all of the recording layers other than the layer located on the deepest side from the light irradiation surface include the oxide of the metal A, the oxide of the metal B, the oxide of the metal C, and the oxide of the metal D, and the relationship of 0.46≤x2 is satisfied.

(14) The optical recording medium according to (13), in which a value of x2 becomes larger in a recording layer that is closer to the light irradiation surface.

(15) The optical recording medium according to (2), in which at least two layers among the two or more recording layers include the oxide of the metal A, the oxide of the metal B, the oxide of the metal C, and the oxide of the metal D, and the relationship of 0.46≤x2 is satisfied, and a relationship in which a value of x2 is greater in a recording layer that is closer to the light irradiation surface is satisfied.

(16) The optical recording medium according to any of (2) and (12) to (15), in which the atomic ratio a, the atomic ratio b, the atomic ratio c, and the atomic ratio d satisfy relationships of 20≤a≤40, 5≤b≤30, 5≤c≤40, and 20≤d≤70, respectively.

(17) The optical recording medium according to any of (1) to (16), further including: a first dielectric layer that is provided on one surface side of each of the recording layers; and a second dielectric layer that is provided on the other surface side of the recording layer.

(18) A recording layer for an optical recording medium, including: an oxide of a metal A; an oxide of a metal B; and an oxide of a metal C, in which the metal A is at least one kind among W, Mo, and Zr, the metal B is Mn, and the metal C is at least one kind among Cu, Ag, and Ni, and ratios of the metal A, the metal B, and the metal C satisfy a relationship of 0.46≤x1 (provided that, x1=a/(b+0.8c), a representing an atomic ratio [atom %] of the metal A with respect to the sum of the metal A, the metal B, and the metal C, b representing an atomic ratio [atom %] of the metal B with respect to the sum of the metal A, the metal B, and the metal C, and c representing an atomic ratio [atom %] of the metal C with respect to the sum of the metal A, the metal B, and the metal C).

(19) A recording layer for an optical recording medium, including: an oxide of a metal A; an oxide of a metal B; an oxide of a metal C; and an oxide of a metal D, in which the metal A is at least one kind among W, Mo, and Zr, the metal B is Mn, the metal C is at least one kind among Cu, Ag, and Ni, and the metal D is at least one kind of Zn and Mg, ratios of the metal A, the metal B, the metal C, and the metal D satisfy a relationship of 0.46≤x2 (provided that, x2=(0.1d+a)/(b+0.8c), a representing an atomic ratio [atom %] of the metal A with respect to the sum of the metal A, the metal B, the metal C, and the metal D, b representing an atomic ratio [atom %] of the metal B with respect to the sum of the metal A, the metal B, the metal C, and the metal D, c representing an atomic ratio [atom %] of the metal C with respect to the sum of the metal A, the metal B, the metal C, and the metal D, and d representing an atomic ratio [atom %] of the metal D with respect to the sum of the metal A, the metal B, the metal C, and the metal D).

(20) A method of manufacturing an optical recording medium, including: a process of forming two or more recording layers by reactive sputtering with at least oxygen, in which among the two or more recording layers, at least one layer other than a layer located on the deepest side from the light irradiation surface irradiated with light for recording an information signal on the two or more recording layers includes an oxide of a metal A, an oxide of a metal B, and an oxide of a metal C, the metal A is at least one kind among W, Mo, and Zr, the metal B is Mn, and the metal C is at least one kind among Cu, Ag, and Ni, and ratios of the metal A, the metal B, and the metal C satisfy a relationship of 0.46≤x1 (provided that, x1=a/(b+0.8c), a representing an atomic ratio [atom %] of the metal A with respect to the sum of the metal A, the metal B, and the metal C, b representing an atomic ratio [atom %] of the metal B with respect to the sum of the metal A, the metal B, and the metal C, and c representing an atomic ratio [atom %] of the metal C with respect to the sum of the metal A, the metal B, and the metal C).

(21) A method of manufacturing an optical recording medium, including: a process of forming two or more recording layers by reactive sputtering with at least oxygen, in which among the two or more recording layers, at least one layer other than a layer located on the deepest side from the light irradiation surface irradiated with light for recording an information signal on the two or more recording layers includes an oxide of a metal A, an oxide of a metal B, an oxide of a metal C, and an oxide of a metal D, the metal A is at least one kind among W, Mo, and Zr, the metal B is Mn, the metal C is at least one kind among Cu, Ag, and Ni, and the metal D is at least one kind of Zn and Mg, and ratios of the metal A, the metal B, the metal C, and the metal D satisfy a relationship of $0.46 \leq x2$ (provided that, $x2=(0.1d+a)/(b+0.8c)$, a representing an atomic ratio [atom %] of the metal A with respect to the sum of the metal A, the metal B, the metal C, and the metal D, b representing an atomic ratio [atom %] of the metal B with respect to the sum of the metal A, the metal B, the metal C, and the metal D, c representing an atomic ratio [atom %] of the metal C with respect to the sum of the metal A, the metal B, the metal C, and the metal D, and d representing an atomic ratio [atom %] of the metal D with respect to the sum of the metal A, the metal B, the metal C, and the metal D).

REFERENCE SIGNS LIST

1 Optical recording medium
10 First disc
20 Second disc
30 Joining layer
11, 21 Substrate
12, 22 Light-transmitting layer
41 Recording layer
42, 43 Dielectric layer
L0 to Ln, L0 to Lm Information signal layer
S1 to Sn, S1 to Sm Spacer layer
C1 First light irradiation surface
C2 Second light irradiation surface
Gv Groove
Ld Land
Tp Pitch

The invention claimed is:

1. An optical recording medium, comprising:
two or more recording layers; and
a light irradiation surface that is irradiated with light for recording an information signal on the two or more recording layers,
wherein among the two or more recording layers, at least one layer other than a layer located on a deepest side from the light irradiation surface includes an oxide of a metal A, an oxide of a metal B, and an oxide of a metal C,
the metal A is at least one kind among W, Mo, and Zr, the metal B is Mn, and the metal C is at least one kind among Cu, Ag, and Ni, and
ratios of the metal A, the metal B, and the metal C satisfy a relationship of $0.46 \leq x1$ (provided that, $x1=a/(b+0.8c)$, a representing an atomic ratio [atom %] of the metal A with respect to a sum of the metal A, the metal B, and the metal C, b representing an atomic ratio [atom %] of the metal B with respect to the sum of the metal A, the metal B, and the metal C, and c representing an atomic ratio [atom %] of the metal C with respect to the sum of the metal A, the metal B, and the metal C),
wherein among the two or more recording layers, all of the recording layers other than the layer located on the deepest side from the light irradiation surface include the oxide of the metal A, the oxide of the metal B, and the oxide of the metal C, and the relationship of $0.46 \leq x1$ is satisfied, and
wherein a value of x1 becomes larger in a recording layer that is closer to the light irradiation surface.

2. An optical recording medium, comprising:
two or more recording layers; and
a light irradiation surface that is irradiated with light for recording an information signal on the two or more recording layers,
wherein among the two or more recording layers, at least one layer other than a layer located on a deepest side from the light irradiation surface includes an oxide of a metal A, an oxide of a metal B, an oxide of a metal C, and an oxide of a metal D,
the metal A is at least one kind among W, Mo, and Zr, the metal B is Mn, the metal C is at least one kind among Cu, Ag, and Ni, and the metal D is at least one kind of Zn and Mg, and
ratios of the metal A, the metal B, the metal C, and the metal D satisfy a relationship of $0.46 \leq x2$ (provided that, $x2=(0.1d+a)/(b+0.8c)$, a representing an atomic ratio [atom %] of the metal A with respect to a sum of the metal A, the metal B, the metal C, and the metal D, b representing an atomic ratio [atom %] of the metal B with respect to the sum of the metal A, the metal B, the metal C, and the metal D, c representing an atomic ratio [atom %] of the metal C with respect to the sum of the metal A, the metal B, the metal C, and the metal D, and d representing an atomic ratio [atom %] of the metal D with respect to the sum of the metal A, the metal B, the metal C, and the metal D),
wherein among the two or more recording layers, all of the recording layers other than the layer located on the deepest side from the light irradiation surface include the oxide of the metal A, the oxide of the metal B, the oxide of the metal C, and the oxide of the metal D, and the relationship of $0.46 \leq x2$ is satisfied, and
wherein a value of x2 becomes larger in a recording layer that is closer to the light irradiation surface.

3. The optical recording medium according to claim 1, wherein each of the recording layers includes a recessed track and a convex track, and
the information signal is capable of being recorded on both the recessed track and the convex track.

4. The optical recording medium according to claim 3, wherein a pitch between the recessed track and the convex track is 0.225 nm or less.

5. The optical recording medium according to claim 3, further comprising:
a dielectric layer that is provided on a surface side, which is opposite to a side irradiated with light for recording or reproducing the information signal, between both surfaces of the recording layer,
wherein a refractive index n and a thickness T of the dielectric layer satisfy a relationship of $n \times T \geq 32$ nm.

6. The optical recording medium according to claim 2, wherein the metal A is W, and the metal D is Zn, and
an atomic ratio of Zn in each of the recording layers is equal to or greater than an atomic ratio of W in the recording layer.

7. The optical recording medium according to claim 1, wherein the metal A, the metal B, and the metal C satisfy a relationship of $0.46 \leq x1 \leq 1.70$.

8. An optical recording medium, comprising:
two or more recording layers; and
a light irradiation surface that is irradiated with light for recording an information signal on the two or more recording layers,
wherein among the two or more recording layers, at least one layer other than a layer located on a deepest side from the light irradiation surface includes an oxide of a metal A, an oxide of a metal B, and an oxide of a metal C, the metal A is at least one kind among W, Mo, and Zr, the metal B is Mn, and the metal C is at least one kind among Cu, Ag, and Ni, and ratios of the metal A, the metal B, and the metal C satisfy a relationship of $0.46 \leq x1$ (provided that, $x1=a/(b+0.8c)$, a representing an atomic ratio [atom %] of the metal A with respect to a sum of the metal A, the metal B, and the metal C, b representing an atomic ratio [atom %] of the metal B with respect to the sum of the metal A, the metal B, and the metal C, and c representing an atomic ratio [atom %] of the metal C with respect to the sum of the metal A, the metal B, and the metal C), wherein at least two layers among the two or more recording layers include the oxide of the metal A, the oxide of the metal B, and the oxide of the metal C, and the relationship of $0.46 \leq x1$ is satisfied, and wherein a relationship in which a value of x1 is greater in a recording layer that is closer to the light irradiation surface is satisfied.

9. The optical recording medium according to claim 1, wherein the atomic ratio a, the atomic ratio b, and the atomic ratio c satisfy relationships of $10 \leq a \leq 70$, $2 \leq b \leq 40$, and $5 \leq c \leq 50$, respectively.

10. The optical recording medium according to claim 2, wherein the ratios of the metal A, the metal B, the metal C, and the metal D satisfy a relationship of $0.46 \leq x2 \leq 1.70$.

11. An optical recording medium, comprising:
two or more recording layers; and
a light irradiation surface that is irradiated with light for recording an information signal on the two or more recording layers,
wherein among the two or more recording layers, at least one layer other than a layer located on a deepest side from the light irradiation surface includes an oxide of a metal A, an oxide of a metal B, an oxide of a metal C, and an oxide of a metal D,
the metal A is at least one kind among W, Mo, and Zr, the metal B is Mn, the metal C is at least one kind among Cu, Ag, and Ni, and the metal D is at least one kind of Zn and Mg, and
ratios of the metal A, the metal B, the metal C, and the metal D satisfy a relationship of $0.46 \leq x2$ (provided that, $x2=(0.1d+a)/(b+0.8c)$, a representing an atomic ratio [atom %] of the metal A with respect to a sum of the metal A, the metal B, the metal C, and the metal D, b representing an atomic ratio [atom %] of the metal B with respect to the sum of the metal A, the metal B, the metal C, and the metal D, c representing an atomic ratio [atom %] of the metal C with respect to the sum of the metal A, the metal B, the metal C, and the metal D, and d representing an atomic ratio [atom %] of the metal D with respect to the sum of the metal A, the metal B, the metal C, and the metal D),
wherein at least two layers among the two or more recording layers include the oxide of the metal A, the oxide of the metal B, the oxide of the metal C, and the oxide of the metal D, and the relationship of $0.46 \leq x2$ is satisfied, and
wherein a relationship in which a value of x2 is greater in a recording layer that is closer to the light irradiation surface is satisfied.

12. The optical recording medium according to claim 2, wherein the atomic ratio a, the atomic ratio b, the atomic ratio c, and the atomic ratio d satisfy relationships of $20 \leq a \leq 40$, $5 \leq b \leq 30$, $5 \leq c \leq 40$, and $20 \leq d \leq 70$, respectively.

13. The optical recording medium according to claim 1, further comprising:
a first dielectric layer that is provided on one surface side of each of the recording layers; and
a second dielectric layer that is provided on another surface side of the recording layer.

14. A method of manufacturing an optical recording medium, comprising:
a process of forming two or more recording layers by reactive sputtering with at least oxygen,
wherein among the two or more recording layers, at least one layer other than a layer located on a deepest side from the light irradiation surface irradiated with light for recording an information signal on the two or more recording layers includes an oxide of a metal A, an oxide of a metal B, and an oxide of a metal C,
the metal A is at least one kind among W, Mo, and Zr, the metal B is Mn, and the metal C is at least one kind among Cu, Ag, and Ni, and
ratios of the metal A, the metal B, and the metal C satisfy a relationship of $0.46 \leq x1$ (provided that, $x1=a/(b+0.8c)$, a representing an atomic ratio [atom %] of the metal A with respect to a sum of the metal A, the metal B, and the metal C, b representing an atomic ratio [atom %] of the metal B with respect to the sum of the metal A, the metal B, and the metal C, and c representing an atomic ratio [atom %] of the metal C with respect to the sum of the metal A, the metal B, and the metal C),
wherein among the two or more recording layers, all of the recording layers other than the layer located on the deepest side from the light irradiation surface include the oxide of the metal A, the oxide of the metal B, and the oxide of the metal C, and the relationship of $0.46 \leq x1$ is satisfied, and
wherein a value of x1 becomes larger in a recording layer that is closer to the light irradiation surface.

15. A method of manufacturing an optical recording medium, comprising:
a process of forming two or more recording layers by reactive sputtering with at least oxygen,
wherein among the two or more recording layers, at least one layer other than a layer located on a deepest side from the light irradiation surface irradiated with light for recording an information signal on the two or more recording layers includes an oxide of a metal A, an oxide of a metal B, an oxide of a metal C, and an oxide of a metal D,
the metal A is at least one kind among W, Mo, and Zr, the metal B is Mn, the metal C is at least one kind among Cu, Ag, and Ni, and the metal D is at least one kind of Zn and Mg, and
ratios of the metal A, the metal B, the metal C, and the metal D satisfy a relationship of $0.46 \leq x2$ (provided that, $x2=(0.1d+a)/(b+0.8c)$, a representing an atomic ratio [atom %] of the metal A with respect to a sum of the metal A, the metal B, the metal C, and the metal D, b representing an atomic ratio [atom %] of the metal B with respect to the sum of the metal A, the metal B, the metal C, and the metal D, c representing an atomic ratio [atom %] of the metal C with respect to the sum of the metal A, the metal B, the metal C, and the metal D, and d representing an atomic ratio [atom %] of the metal D with respect to the sum of the metal A, the metal B, the metal C, and the metal D),
wherein among the two or more recording layers, all of the recording layers other than the layer located on the deepest side from the light irradiation surface include the oxide of the metal A, the oxide of the metal B, the oxide of the metal C, and the oxide of the metal D, and the relationship of 0.46≤x2 is satisfied, and wherein a value of x2 becomes larger in a recording layer that is closer to the light irradiation surface.

16. A method of manufacturing an optical recording medium, comprising:

a process of forming two or more recording layers by reactive sputtering with at least oxygen, wherein among the two or more recording layers, at least one layer other than a layer located on a deepest side from the light irradiation surface irradiated with light for recording an information signal on the two or more recording layers includes an oxide of a metal A, an oxide of a metal B, and an oxide of a metal C, the metal A is at least one kind among W, Mo, and Zr, the metal B is Mn, and the metal C is at least one kind among Cu, Ag, and Ni, and ratios of the metal A, the metal B, and the metal C satisfy a relationship of 0.46≤x1 (provided that, x1=a/(b+0.8c), a representing an atomic ratio [atom %] of the metal A with respect to a sum of the metal A, the metal B, and the metal C, b representing an atomic ratio [atom %] of the metal B with respect to the sum of the metal A, the metal B, and the metal C, and c representing an atomic ratio [atom %] of the metal C with respect to the sum of the metal A, the metal B, and the metal C), wherein at least two layers among the two or more recording layers include the oxide of the metal A, the oxide of the metal B, and the oxide of the metal C, and the relationship of 0.46≤x1 is satisfied, and wherein a relationship in which a value of x1 is greater in a recording layer that is closer to the light irradiation surface is satisfied.

17. A method of manufacturing an optical recording medium, comprising:

a process of forming two or more recording layers by reactive sputtering with at least oxygen, wherein among the two or more recording layers, at least one layer other than a layer located on a deepest side from the light irradiation surface irradiated with light for recording an information signal on the two or more recording layers includes an oxide of a metal A, an oxide of a metal B, an oxide of a metal C, and an oxide of a metal D, the metal A is at least one kind among W, Mo, and Zr, the metal B is Mn, the metal C is at least one kind among Cu, Ag, and Ni, and the metal D is at least one kind of Zn and Mg, and ratios of the metal A, the metal B, the metal C, and the metal D satisfy a relationship of 0.46≤x2 (provided that, x2=(0.1d+a)/(b+0.8c), a representing an atomic ratio [atom %] of the metal A with respect to a sum of the metal A, the metal B, the metal C, and the metal D, b representing an atomic ratio [atom %] of the metal B with respect to the sum of the metal A, the metal B, the metal C, and the metal D, c representing an atomic ratio [atom %] of the metal C with respect to the sum of the metal A, the metal B, the metal C, and the metal D, and d representing an atomic ratio [atom %] of the metal D with respect to the sum of the metal A, the metal B, the metal C, and the metal D), wherein at least two layers among the two or more recording layers include the oxide of the metal A, the oxide of the metal B, the oxide of the metal C, and the oxide of the metal D, and the relationship of 0.46≤x2 is satisfied, and wherein a relationship in which a value of x2 is greater in a recording layer that is closer to the light irradiation surface is satisfied.

* * * * *